United States Patent
Baldwin, Jr. et al.

(10) Patent No.: US 10,005,014 B2
(45) Date of Patent: Jun. 26, 2018

(54) ADDITIVE CARRIER FOR SPIN ON FILTERS

(71) Applicants: Donald W. Baldwin, Jr., Louisville, KY (US); Christopher Montelauro, Bowling Green, OH (US)

(72) Inventors: Donald W. Baldwin, Jr., Louisville, KY (US); Christopher Montelauro, Bowling Green, OH (US)

(73) Assignee: Fram Group IP LLC, Lake Forest, IL (US)

( * ) Notice: Subject to any disclaimer, the term of this patent is extended or adjusted under 35 U.S.C. 154(b) by 760 days.

(21) Appl. No.: 13/748,930

(22) Filed: Jan. 24, 2013

(65) Prior Publication Data
US 2013/0193050 A1    Aug. 1, 2013

Related U.S. Application Data

(60) Provisional application No. 61/592,136, filed on Jan. 30, 2012.

(51) Int. Cl.
*B01D 37/02* (2006.01)
*F01M 9/02* (2006.01)
*B01D 27/06* (2006.01)

(52) U.S. Cl.
CPC ............ *B01D 37/025* (2013.01); *B01D 27/06* (2013.01); *B01D 2201/291* (2013.01); *F01M 9/02* (2013.01)

(58) Field of Classification Search
CPC .......... B01D 46/2414; B01D 2201/291; B01D 2201/293; B01D 2201/295; B01D 35/00; B01D 35/005; C02F 1/685–1/688; F01M 9/02
See application file for complete search history.

(56) References Cited

U.S. PATENT DOCUMENTS

| | | |
|---|---|---|
| 4,377,485 A | 3/1983 | Krofta |
| 6,379,564 B1 | 4/2002 | Rohrbach et al. |
| 6,623,636 B2 | 9/2003 | Rohrbach et al. |
| 7,998,346 B2 | 8/2011 | Bilski et al. |
| 2005/0019236 A1 | 1/2005 | Martin et al. |

(Continued)

FOREIGN PATENT DOCUMENTS

| | | |
|---|---|---|
| DE | 102005003963 | 8/2005 |
| WO | WO 03055810 | 7/2003 |
| WO | WO 2006/137969 | 12/2006 |

OTHER PUBLICATIONS

International Search Report dated Jun. 25, 2008, International Application No. PCT/US2008/053843.

(Continued)

*Primary Examiner* — Lucas A Stelling
*Assistant Examiner* — Angel Olivera
(74) *Attorney, Agent, or Firm* — Elizabeth A. Peters; Barnes & Thornburg LLP

(57) ABSTRACT

An additive carrier for a spin-on filter is provided. The additive carrier is positioned at an upstream side of the filter and includes a basket defining an annular body. The annular body includes a concentric opening extending therethrough, a circumferentially extending recess configured to receive and store an additive material and a plurality of flanges extending radially within the recess, the flanges spaced apart in a circumferential direction of the recess to form a plurality of sub-recesses.

19 Claims, 37 Drawing Sheets

(56) References Cited

U.S. PATENT DOCUMENTS

| | | |
|---|---|---|
| 2005/0040092 A1 | 2/2005 | Eilers et al. |
| 2005/0150569 A1* | 7/2005 | Garvin ................. B01D 37/025 141/100 |
| 2005/0167351 A1* | 8/2005 | Herman ............... B01D 37/025 210/209 |
| 2005/0194301 A1 | 9/2005 | Hacker et al. |
| 2007/0084169 A1* | 4/2007 | Ehrenberg ......... B01D 46/2414 55/498 |
| 2007/0235374 A1* | 10/2007 | Wright ................. B01D 27/103 210/130 |
| 2008/0190504 A1* | 8/2008 | Bilski ................. B01D 37/025 137/888 |
| 2011/0163047 A1 | 7/2011 | Bilski et al. |
| 2011/0272338 A1 | 11/2011 | Bilski et al. |

OTHER PUBLICATIONS

Supplementary European Search Report dated Mar. 1, 2011.
Written Opinion of International Searching Authority dated Jun. 25, 2008, International Application No. PCT/US2008/053843.
International Search Report dated Aug. 22, 2011; International Application No. PCT/US2010/062332.
Written Opinion of International Searching Authority dated Aug. 22, 2011; International Application No. PCT/US2010/062332.

* cited by examiner

FIG. 10

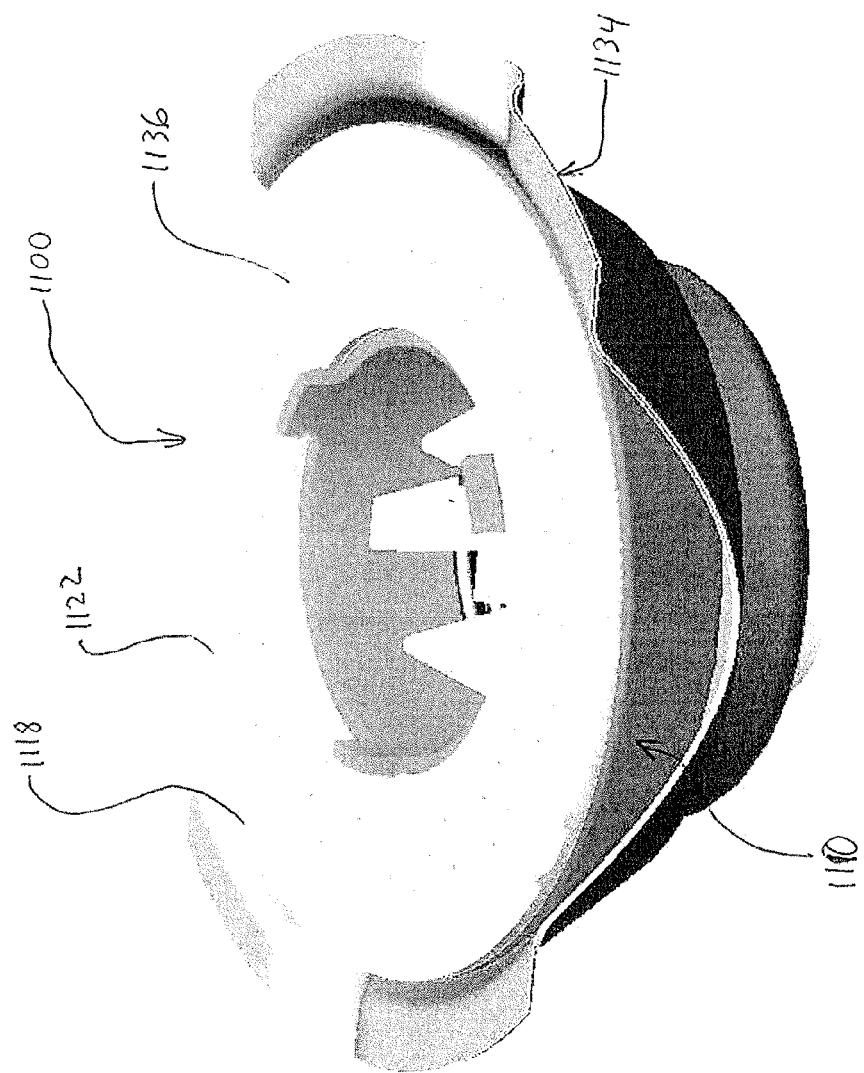

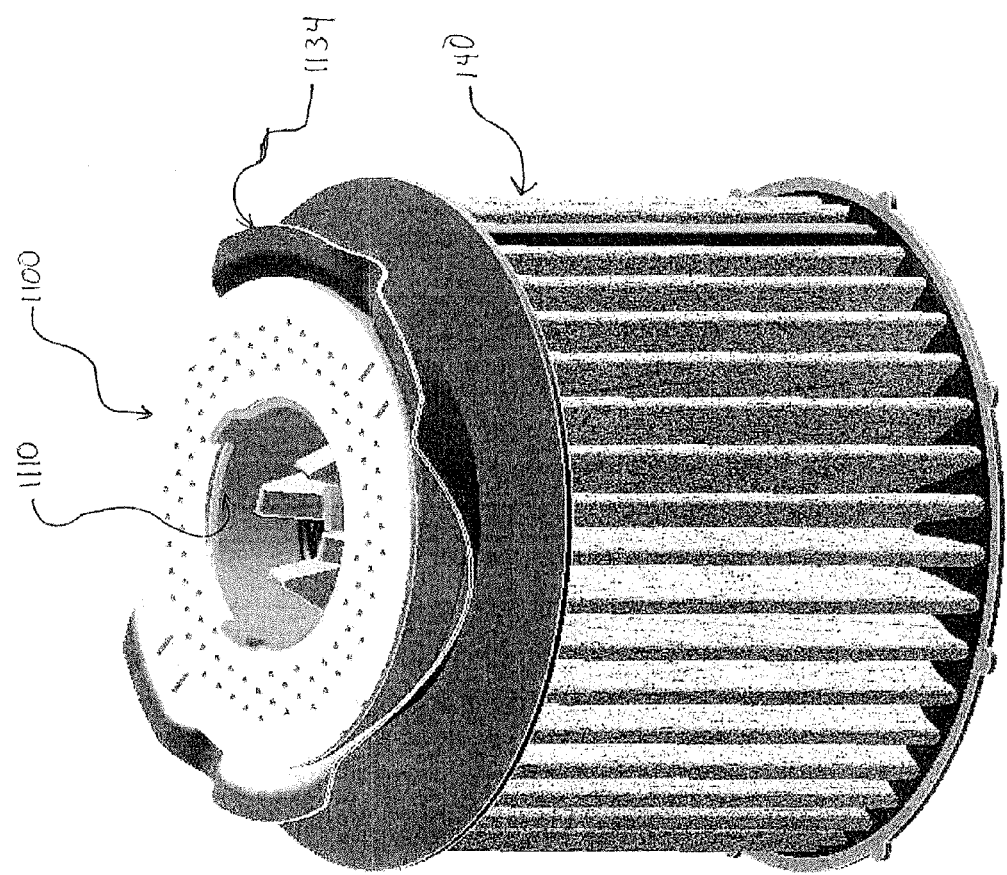

ADDITIVE CARRIER FOR SPIN ON FILTERS

CROSS REFERENCE TO RELATED APPLICATIONS

The present application claims the benefit of U.S. Provisional Application Ser. No. 60/592,136, filed on Jan. 30, 2012, and entitled "Additive Carrier for Spin-On Filter," the disclosure of which is incorporated herein in its entirety.

Reference is made to the following applications: U.S. patent application Ser. No. 13/178,096 filed Jul. 7, 2011, which is a divisional application of Ser. No. 12/030,595, filed Feb. 13, 2008, now U.S. Pat. No. 7,998,346 and U.S. patent application Ser. No. 12/980,814, filed Dec. 29, 2010, the contents each of which are incorporated herein by reference thereto.

BACKGROUND

The following description relates to additive carriers, and more specifically, additive carriers for spin on filters.

A spin on filter is configured to filter contaminants from a fluid passing through the filter. It may be desirable to deliver an additive material to the fluid to improve performance characteristics. However, there is only limited space available in traditional spin on filters to provide a carrier to deliver the additive material. Thus, in traditional filter arrangements, a carrier is provided on a "clean side" of filter to deliver the additive material to the fluid. That is, in traditional configurations, an additive material is delivered to fluid after the fluid has been filtered. One drawback of such a configuration is that the fluid passing through the filter has not been treated by the additive material. The untreated fluid may adversely affect the service life of the filter.

In addition, during manufacturing, an additive material may become heated and liquefied. As a result, during manufacturing, if the orientation of the carrier is changed such that the carrier is tilted in a certain direction, the additive material may flow out of the carrier.

Accordingly, it may be desirable to provide an additive carrier which may be integrated with a support structure of a spin on filter on an upstream or "dirty" side of the filter, utilizing existing space in the spin on filter. It may also be desirable to provide a lid for the additive carrier to retain additive material within the carrier during a manufacturing process while still allowing the fluid to be filtered to communicate with the additive material.

SUMMARY

According to one aspect, there is provided an additive carrier for a spin-on filter. The additive carrier includes a basket defining an annular body. The annular body includes a concentric opening extending therethrough, a circumferentially extending recess configured to receive and store an additive material and a plurality of flanges extending radially within the recess, the flanges spaced apart in a circumferential direction of the recess to form a plurality of sub-recesses.

According to another aspect, there is provided a spin-on filter. The spin-on filter includes a support structure including a first end plate at a first end of the structure a second end plate at a second end of the structure, and a central opening formed in and extending though at least the first end plate. The first end of the structure is an upstream end of the spin-on filter. The spin-on filter further includes a filter medium disposed between the first end plate and second end plate in a substantially cylindrical configuration, a relief valve including a plurality of legs at least partially seated in the central opening, and an additive carrier positioned at the first end of the support structure. The additive carrier includes a basket in the form of an annular body. The annular body including a concentric opening extending therethrough, a circumferentially extending recess configured to receive and store an additive material, and a plurality of flanges extending radially within the recess, the flanges spaced apart in a circumferential direction of the recess to form a plurality of sub-recesses.

The above described and other features are exemplified by the following figures and detailed description.

DRAWINGS

Referring now to the figures, which are exemplary embodiments, and wherein like elements are numbered alike:

FIG. 10 is a perspective view showing a side profile of the basket of FIG. 7 assembled with a retainer according to the second exemplary embodiment of the present invention;

FIG. 36 is a perspective view of the lid of FIG. 34 together with a basket and a retainer; and FIG. 37 is a perspective view of the lid of FIG. 34 together with a basket, a retainer, and a filter assembly.

DETAILED DESCRIPTION

Figure 1:
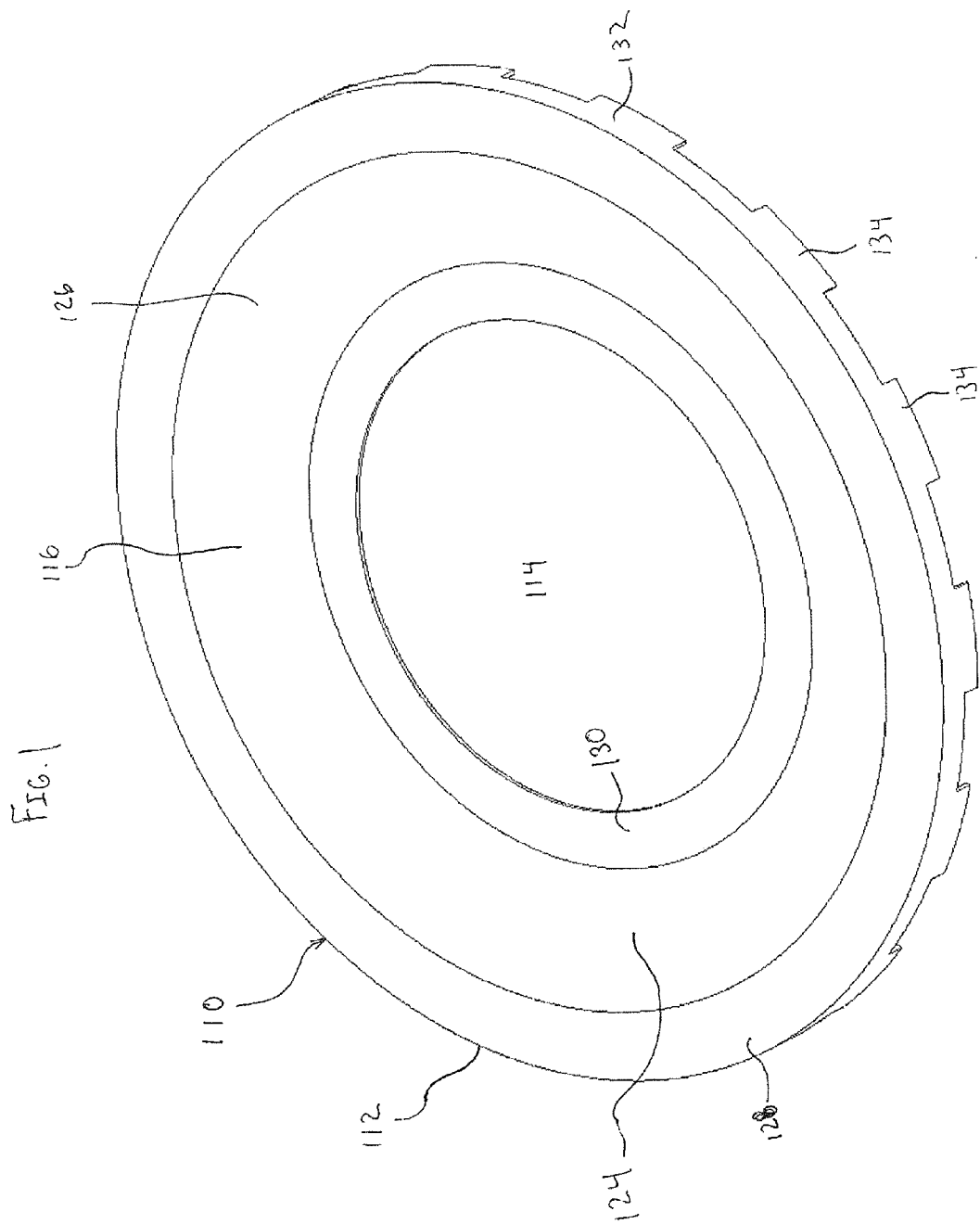
FIG. 1 is a perspective view showing one side of a basket according to an exemplary embodiment of the present invention.
Figure 2:
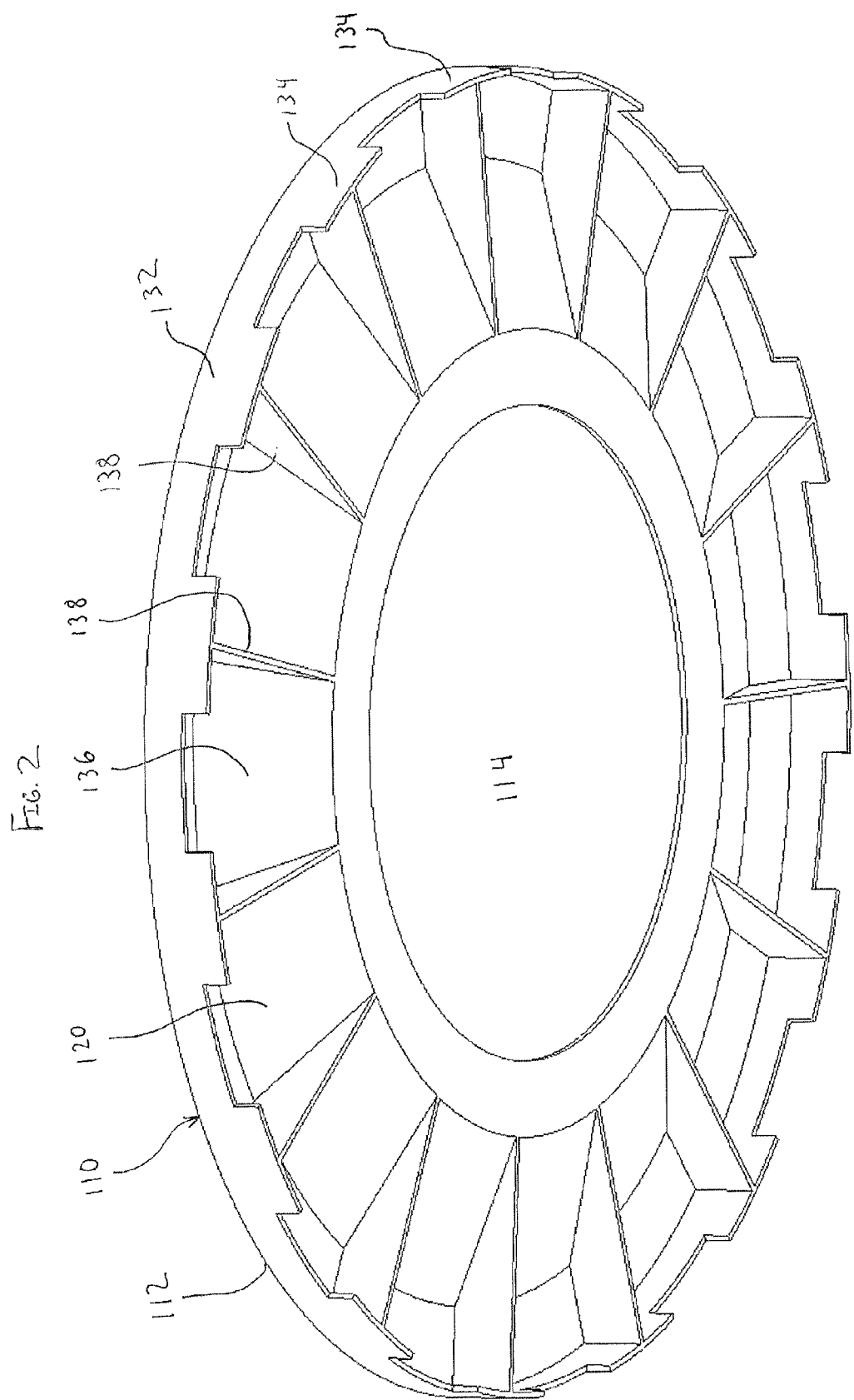
FIG. 2 is a perspective view showing an opposite side of the basket of FIG. 1.
Figure 3:
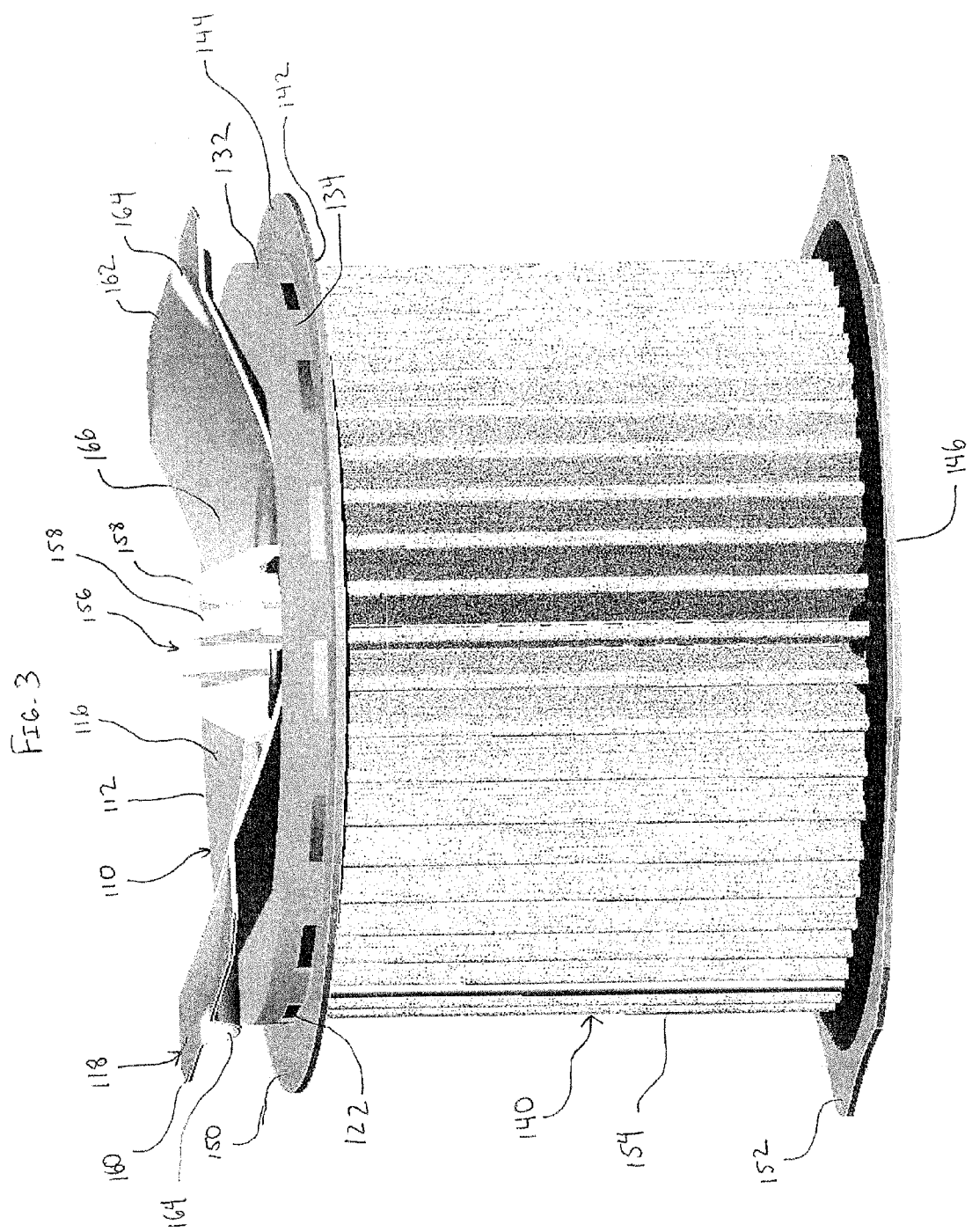
FIG. 3 illustrates the basket of FIG. 1 assembled with a retainer and a filter assembly according to an exemplary embodiment of the present invention.

With reference to the figures, a carrier assembly may include a basket and a retainer. A basket constructed in accordance with a first exemplary embodiment of the present invention is indicated generally at 110. With reference to FIGS. 1-3, the basket 110 is in the form of a generally annular shaped body 112 having a concentric annular opening 114 formed therethrough.

The body 112 includes a first side, referred to herein as a retainer side 116, that is configured to generally face a retainer 118. In an exemplary embodiment, the retainer side acts as a seat for the retainer 118. The body 112 also includes a second side, referred to herein as an additive storage side 120, opposite to the retainer side 116, configured to store an additive material 122.

With reference to FIGS. 1 and 3, according to an exemplary embodiment of the present invention, the retainer side 116 of the basket 110 includes a first recess 124. The first recess 124 has an annular shape and extends within the body 112. The first recess 124 is configured to receive at least a portion of the retainer 118 and may act as a seat for the retainer 118. The first recess 124 is defined by a generally frustoconical section 126 of the annular body 112 extending between a first axial position and a second axial position. The frustoconical section 126 has a first diameter at the first axial position and a second diameter at the second axial position. The first diameter is greater than the second diameter.

Further, in the exemplary embodiment of FIG. 1, the annular body 112 includes a first annular plate 128 extending around an outer circumference of the frustoconical section 126 at the first axial position and a second annular plate 130 extending around an inner circumference of the frustoconical section 126 at the second axial position. The second annular plate 130 is proximate to the opening 114. In an exemplary embodiment, the first annular plate 128, second annular plate 130 and frustoconical section 126 are formed integrally with each other. However, these features may be formed separately and fixed together using suitable fasteners.

The annular body 112 also includes a retaining wall 132 extending in an axial direction around an outer circumference of the body 112. In the exemplary embodiment of FIG. 1, the retaining wall 132 extends about an outer circumference of the first annular plate 128. The retaining wall includes a plurality of axially extending projections 134. In an exemplary embodiment, the projections 134 are spaced apart in the circumferential direction, and may be equally spaced apart.

With reference to FIG. 2, the additive storage side 120 of the body 112 includes a second recess 136. The second recess 136 is bound generally by the frustoconical section 126, first annular plate 128 and retaining wall 132. The frustoconical section 126, first annular plate 128 and retaining wall 132 define a profile of the second recess 136.

A plurality of flanges 138 extend radially within the second recess 136 on the additive storage side 120. The flanges 138 are spaced in a circumferential direction of the body 112. In an exemplary embodiment, the flanges 138 may be spaced equally apart in the circumferential direction. The flanges 138 extend radially across the second recess 136. In an exemplary embodiment, the flanges 138 extend from the retaining wall 132 to a boundary between the frustoconical section 126 and second annular plate 130. It is understood that the present invention is not limited to such a configuration, however, and that the flanges 138 may extend to other points within the second recess 136.

The flanges 138 divide the second recess 136 into a plurality of sub-recesses configured to store the additive material 122 (See FIG. 3). One side of the respective flanges 138 abuts the additive storage side 120 of the basket 110 and matches the profile of the second recess 136. The respective flanges 138 extend away from the additive storage side 120 generally to the same axial position such that the flanges 138 are of substantially equal height.

Figure 4:
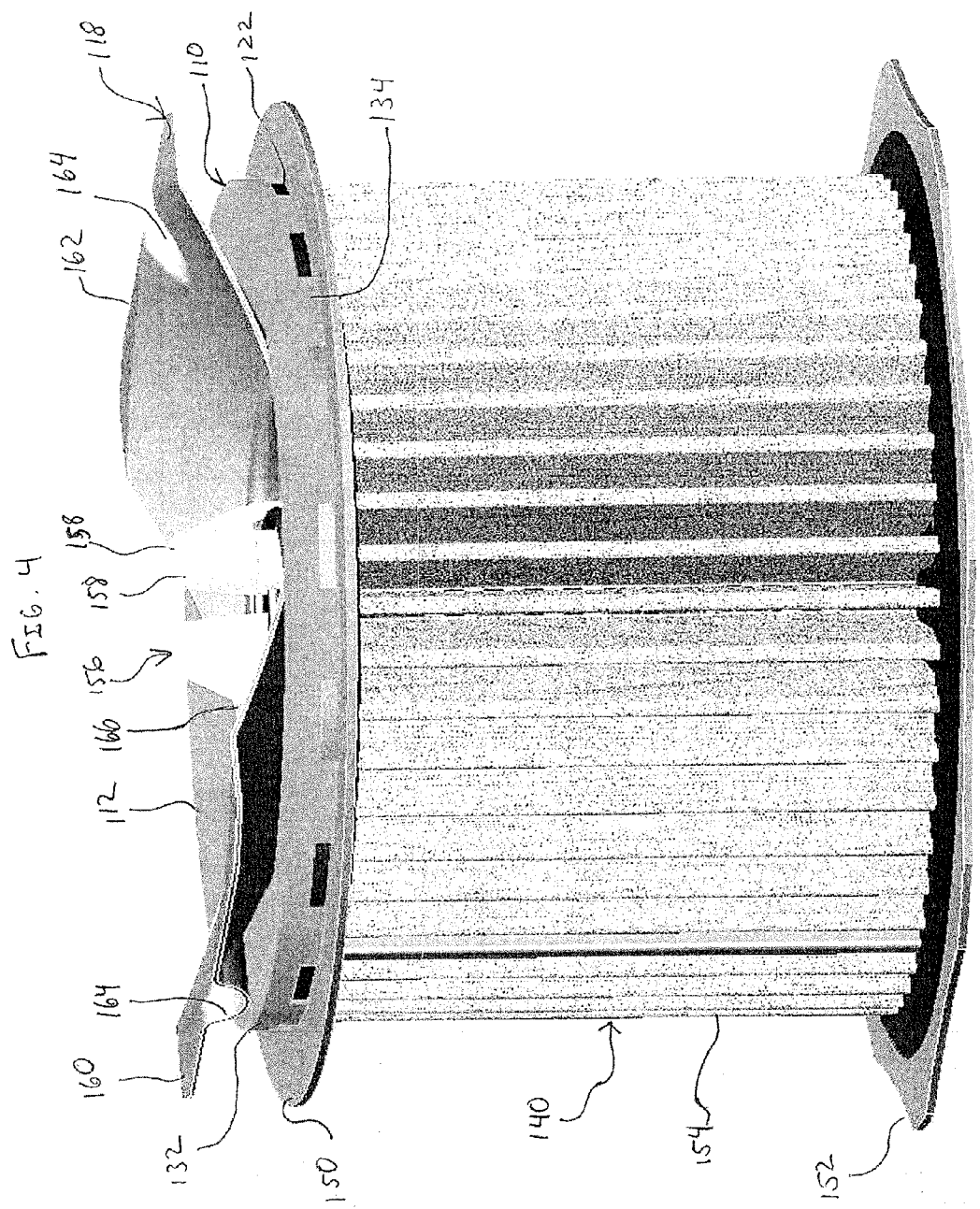
FIG. 4 illustrates the basket of FIG. 1 assembled with a retainer and filter assembly according to an exemplary embodiment of the present invention.
Figure 5:
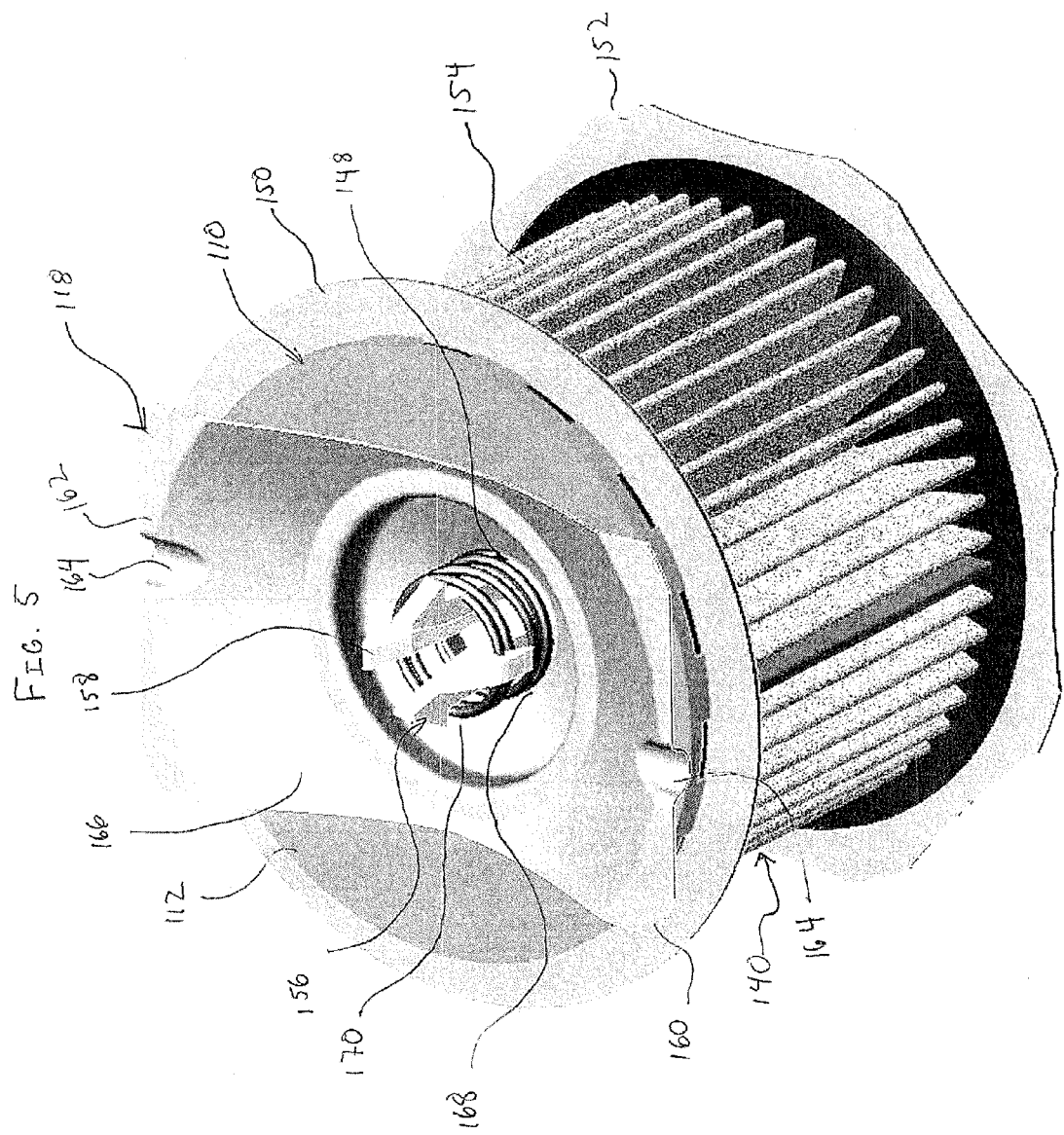
FIG. 5 is a perspective view of the basket of FIG. 1 and a retainer assembled with a filter assembly according to an exemplary embodiment of the present invention.

The basket 110 may be assembled with a filter assembly 140 as shown in FIGS. 3-5. The filter assembly 140 includes a support structure 142 having a first end 144, a second end 146 and an opening 148 extending therethrough. The support structure 142 also includes a first end plate 150 formed at the first end 144 and a second end plate 152 formed at the second end 146. A filter medium 154 is disposed about the support structure 142 between the first end plate 150 and second end plate 152.

A relief valve 156 is positioned within the opening 148 of the support structure 142 and includes a plurality of legs 158 extending outwardly from the opening 148 at the first end 144 of the support structure 142.

FIGS. 3-5 illustrate the basket 110 assembled together with a retainer 118 and filter assembly 140. The retainer 118 generally includes a first end 160 and a second end 162 opposite from the first end 160. The first end 160 and second end 162 each include a depression 164 which may be used for handling of the retainer 118. A cup or bowl shaped portion 166 is formed in the retainer 118 between the first end 160 and second end 162.

The retainer 118 further includes an aperture 168 formed in a central area thereof. When assembled with the filter 140 and basket 110, the aperture 168 is concentric with the opening 114 of the basket 110 and the opening 148 of the filter 140. The legs 158 of the relief valve 156 extend through the opening 114 of the basket 110 and the aperture 168 of the retainer 118. A spring 170 may be positioned about the legs 158 of the relief valve 156.

In an exemplary embodiment, when assembled, the retainer 118 is positioned on the retainer side 116 of the basket 110. At least one of the first annular plate 128, second annular plate and/or frustoconical section 116 may act as a seat for the retainer 118.

The basket 110 and retainer 118 may be assembled on the first end 144 of the filter assembly 140. At this end, the basket 110 and retainer 118 utilize existing space found in traditional filter assemblies. Further, at the first end 144, the additive material stored 122 stored in the basket 110 is in fluid communication with a fluid to be filtered. That is, the basket 110 is positioned on a dirty side of the filter assembly 140 such that additive material 122 may be added to dirty fluid, thereby treating the fluid prior to passing though the filter assembly 140. Because a fluid treated with the additive material is passed through the filter assembly 140, the service life of the filter may be improved.

Figure 6:
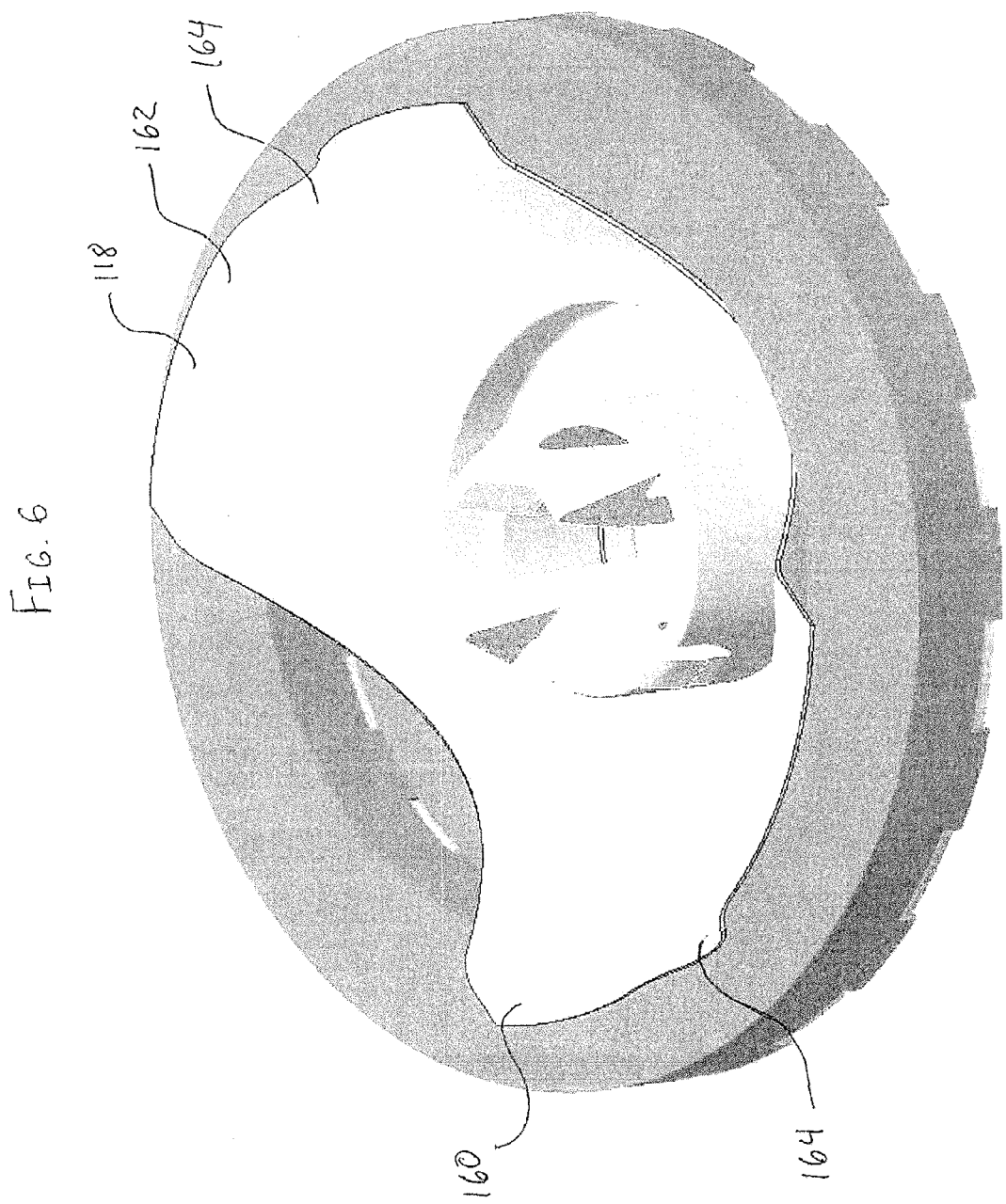
FIG. 6 is a perspective view of the basket of FIG. 1 assembled with a retainer according to another exemplary embodiment of the present invention.

FIG. 6 illustrates another exemplary embodiment of the retainer 118 shown in FIGS. 1-5. Here, the retainer 118 is dimensioned so as to not extend diametrically beyond an outer circumference of the basket. This assembly may be used in smaller filters where available space is further limited.

Figure 7:
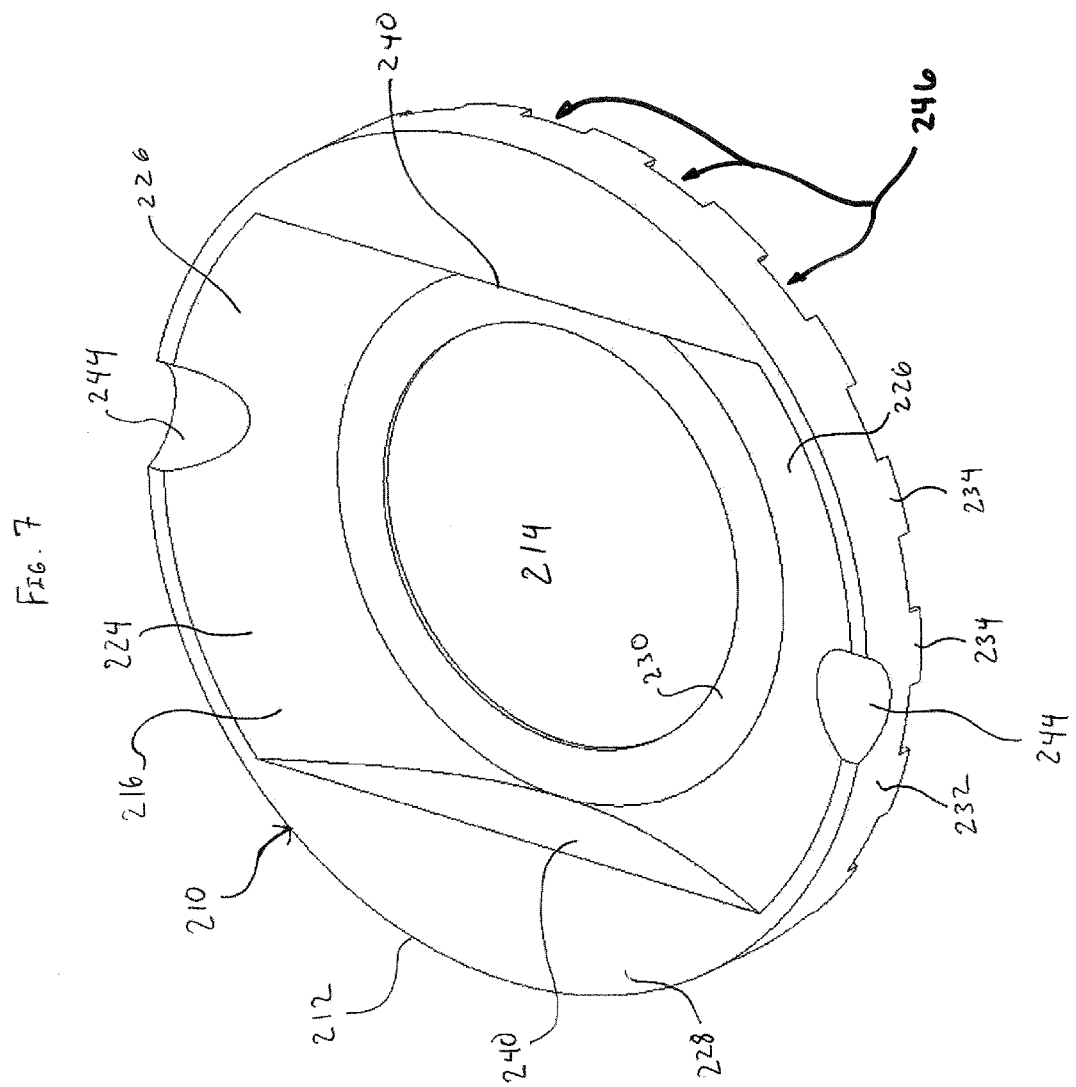
FIG. 7 is a perspective view showing one surface of a basket according to a second exemplary embodiment of the present invention.
Figure 8:
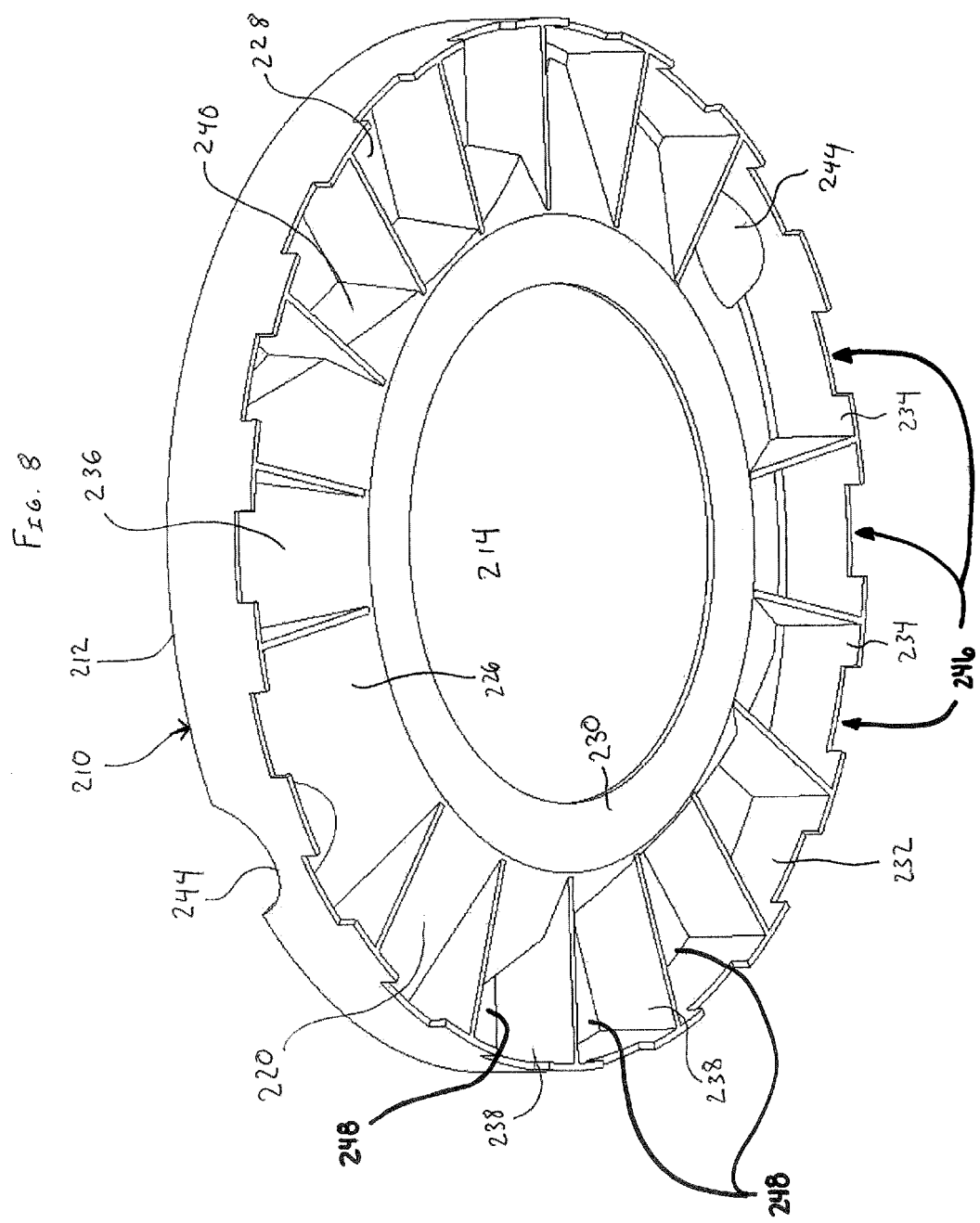
FIG. 8 is a perspective view showing an opposite surface of the basket of FIG. 7.

FIGS. 7 and 8 illustrate a basket 210 constructed according to a second exemplary embodiment of the present invention. The basket 210 is formed as an annular body 212 having a concentric opening 214. With reference to FIG. 7, the body 212 includes a retainer side 216. The retainer side 216 of the basket includes a first recess 224. The first recess 224 extends from a first axial position to a second axial position. An annular plate 230 is disposed at the second axial position proximate to the opening 214. The first recess 224 is bounded by two generally parallel sidewalls 240 and two side walls which in the form of a partial frustoconical section 226.

On the retainer side 216, the annular body 212 presents a top plate 228 at the first axial position. The first plate 228 includes two areas of increased radial thickness 242 between a respective parallel sidewall and outer circumference of the annular body 212. In addition, the annular body 212, on the retainer side 216, includes two depressions 244 positioned at diametrically opposite sides, which may be used, for example, in handling of the basket 210.

An axially extending retaining wall 232 extends about a circumference of the annular body 212. The retaining wall 232 extends axially from the first axial position toward the second axial position, and includes a plurality of axial projections 234 extending therefrom. In an exemplary embodiment, the projections 234 are equally spaced from each other in the circumferential direction of the annular body 212. In illustrative embodiments and as illustrated in FIGS. 7-8, the retaining wall 232 is formed to include one or more flow apertures or gaps 246 between the axial projections 234. In various embodiments a single gap 246 is formed between two axial projections 234, and a plurality of gaps 246 are formed around the circumference of the annular body 212. As with the axial projections 234, the gaps 246 may be equally spaced apart from each other in the circumferential direction of the annular body 212.

With reference to FIG. 8, the annular body 212 includes an additive storage side 220. The additive storage side 220 includes a second recess 236 extending circumferentially around the additive storage side 220 of the annular body 212. The second recess 236 is formed by the retaining wall 232, partial frustoconical sections 226, parallel sidewalls 240, and the top plate 228. In illustrative embodiments, the second recess 236 is accessible via at least the gaps 246 formed in the retaining wall 232 between the axial projections 234.

A plurality of radially extending flanges 238 is disposed within the second recess 236. The flanges 238 are spaced apart in the circumferential direction of the annular body 212 and divide the second recess 236 into a plurality of sub-recesses 248. The volume of a particular sub-recess 248 varies depending on the location of the sub-recess 248. For example, a sub-recess 248 formed in the region of the generally parallel sidewalls 240 may include at least a portion having a generally constant depth corresponding to the top plate 228. Accordingly, sub-recesses 248 in this region have a greater volume than sub-recesses 248 formed in a region where a depth of the sub-recesses 248 decreases along a radially inward path, for example, in a region of the partial frustoconical sections 226. The sub-recesses 248 are accessible to fluid flowing through the spin-on filter by way of the gaps 246 formed in the retaining wall 232. In various embodiments, the retaining wall 232 includes at least one gap 246 that corresponds or is adjacent to each sub-recess 248. The additive material 122 stored in the sub-recesses 248 may be delivered to a fluid via the gaps 246 formed in the retaining wall 232.

Figure 9:
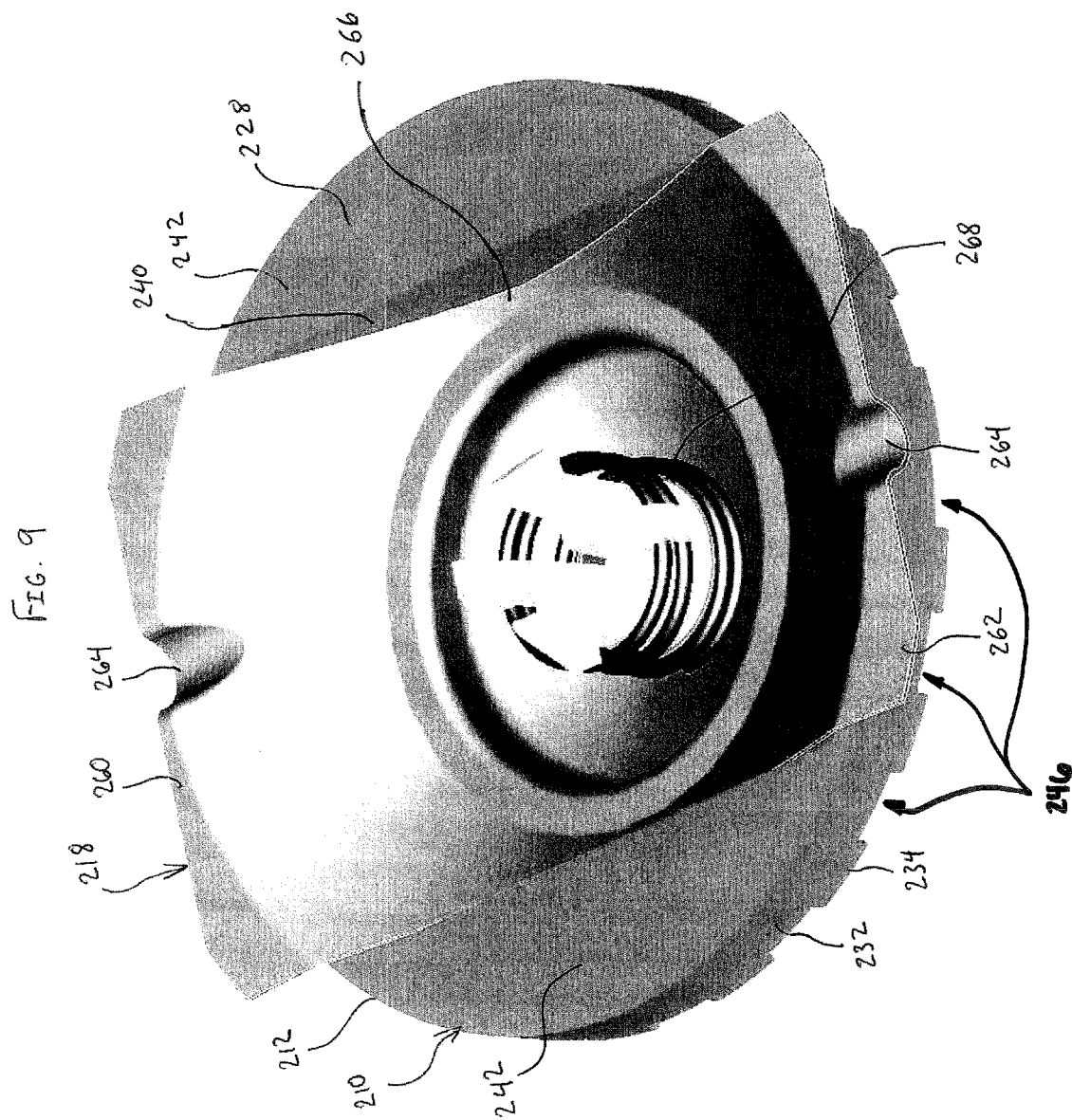
FIG. 9 is a perspective view of the basket of FIG. 7 assembled with a retainer according to the second exemplary embodiment of the present invention.
Figure 10:
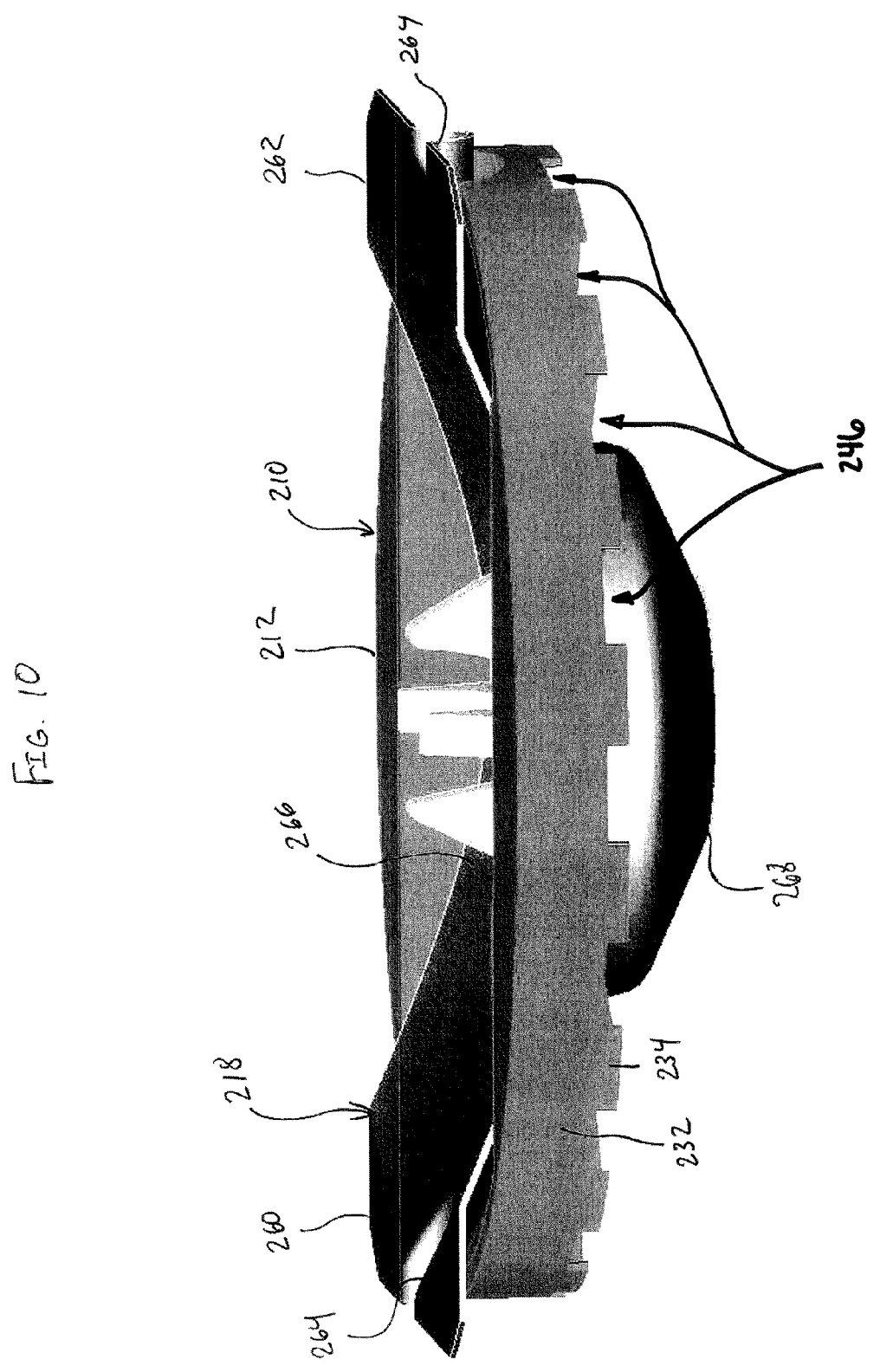

FIGS. 9 and 10 illustrate the basket 210 of FIGS. 7 and 8 assembled together with a retainer 218. The retainer 218 generally includes a first end 260 and a second end 262 opposite from the first end 260. The first end 260 and second end 262 each include a depression 264 which may be used for handling of the retainer 218. A cup or bowl shaped portion 266 is formed in the retainer 218 between the first end 260 and second end 262. The retainer 218 further includes an aperture 268 formed in a central area thereof.

Figure 11:
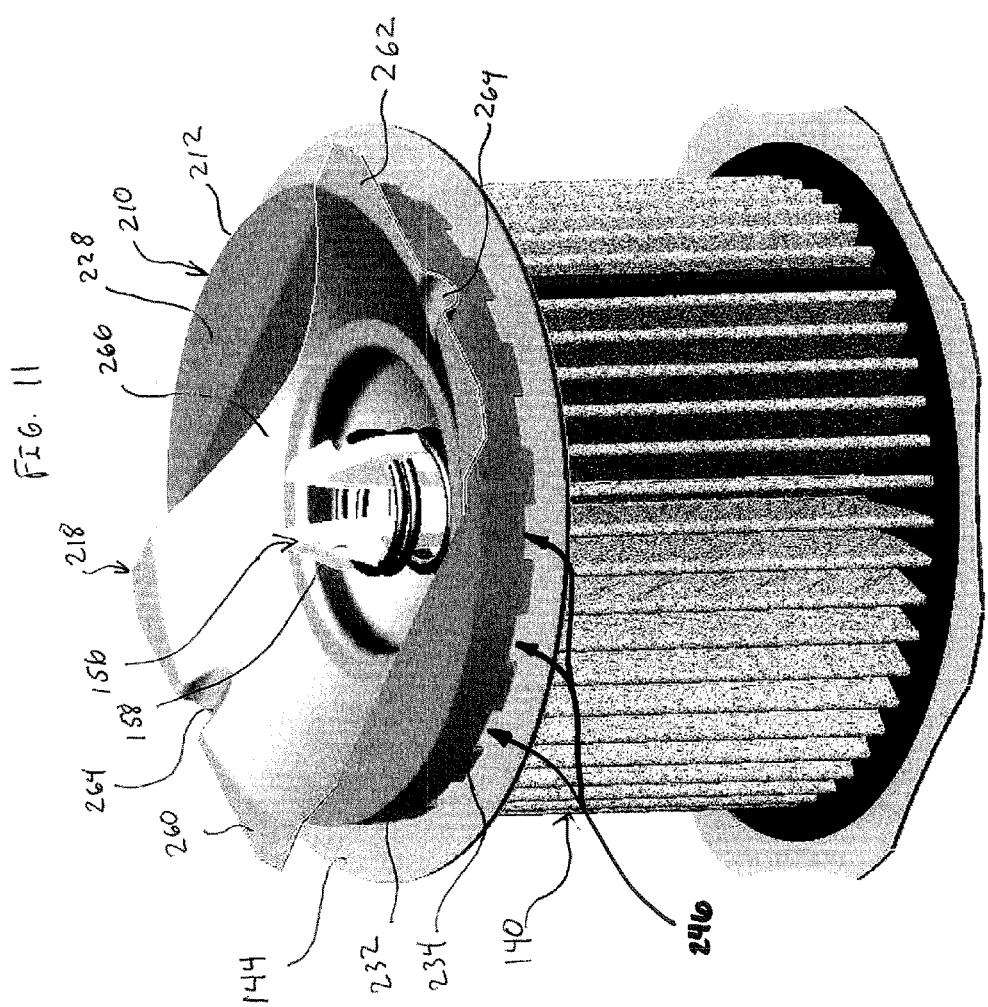
FIG. 11 is a perspective view of the basket of FIG. 7 assembled with a retainer and a filter assembly according to the second exemplary embodiment of the present invention.

As shown in FIG. 11, the retainer 218 and basket 210 may be assembled together with a filter assembly 140. The filter assembly may the same filter assembly described above with reference to FIGS. 3-5, and will be referred to using the same reference numerals. However, the retainer 218 and basket 210 may be assembled with other suitable filter assemblies.

When assembled with the filter assembly 140 and basket 210, the retainer aperture 268 is concentric with the opening 214 of the basket 210 and the opening 148 of the filter 140. The legs 158 of the relief valve 156 extend through the opening 214 of the basket 210 and the retainer aperture 268 of the retainer 218. A spring 170 may be positioned about the legs 158 of the relief valve 156.

In an exemplary embodiment, when assembled, the retainer 218 is positioned on the retainer side 216 of the basket 210. At least one of the top plate 228, annular plate 230 and/or partial frustoconical sections 226 may act as a seat for the retainer 218.

With further reference to FIG. 11, the basket 210 and retainer 218 may be assembled on the first end 144 of the filter assembly 140. At this end, the basket 210 and retainer 218 utilize existing space found in traditional filter assemblies. Further, at the first end 144, additive material stored 122 stored in the basket 210 may be delivered to a fluid to be filtered. That is, the basket 210 is positioned on a dirty side of the filter such that additive material 122 may be added to the dirty fluid, thereby treating the fluid prior to passing though the filter assembly 140. Because a fluid treated with the additive material 122 is passed through the filter assembly 140, the service life of the filter may be improved.

Figure 12:
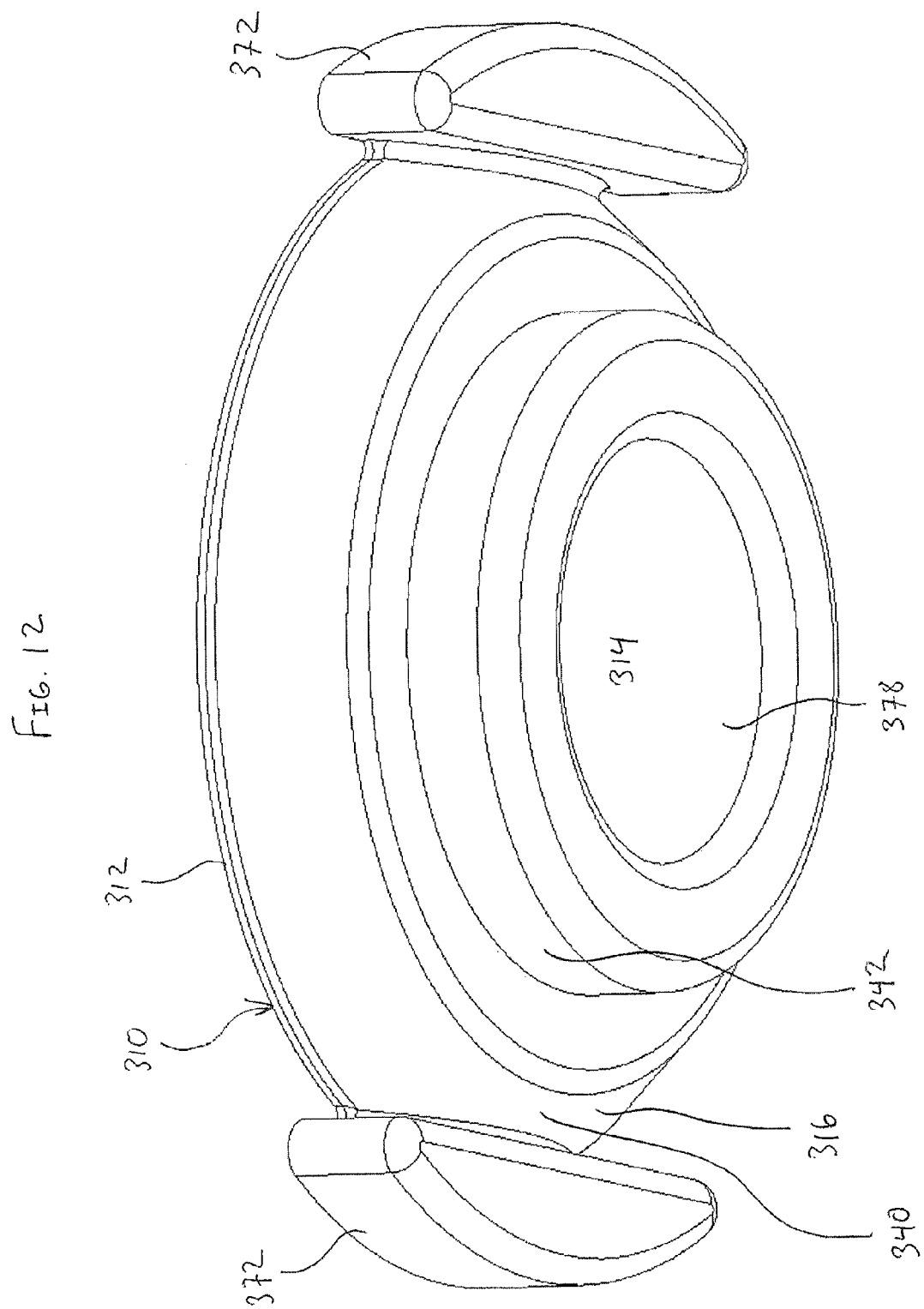
FIG. 12 is a perspective view showing one surface of a basket according to a third exemplary embodiment of the present invention.
Figure 13:
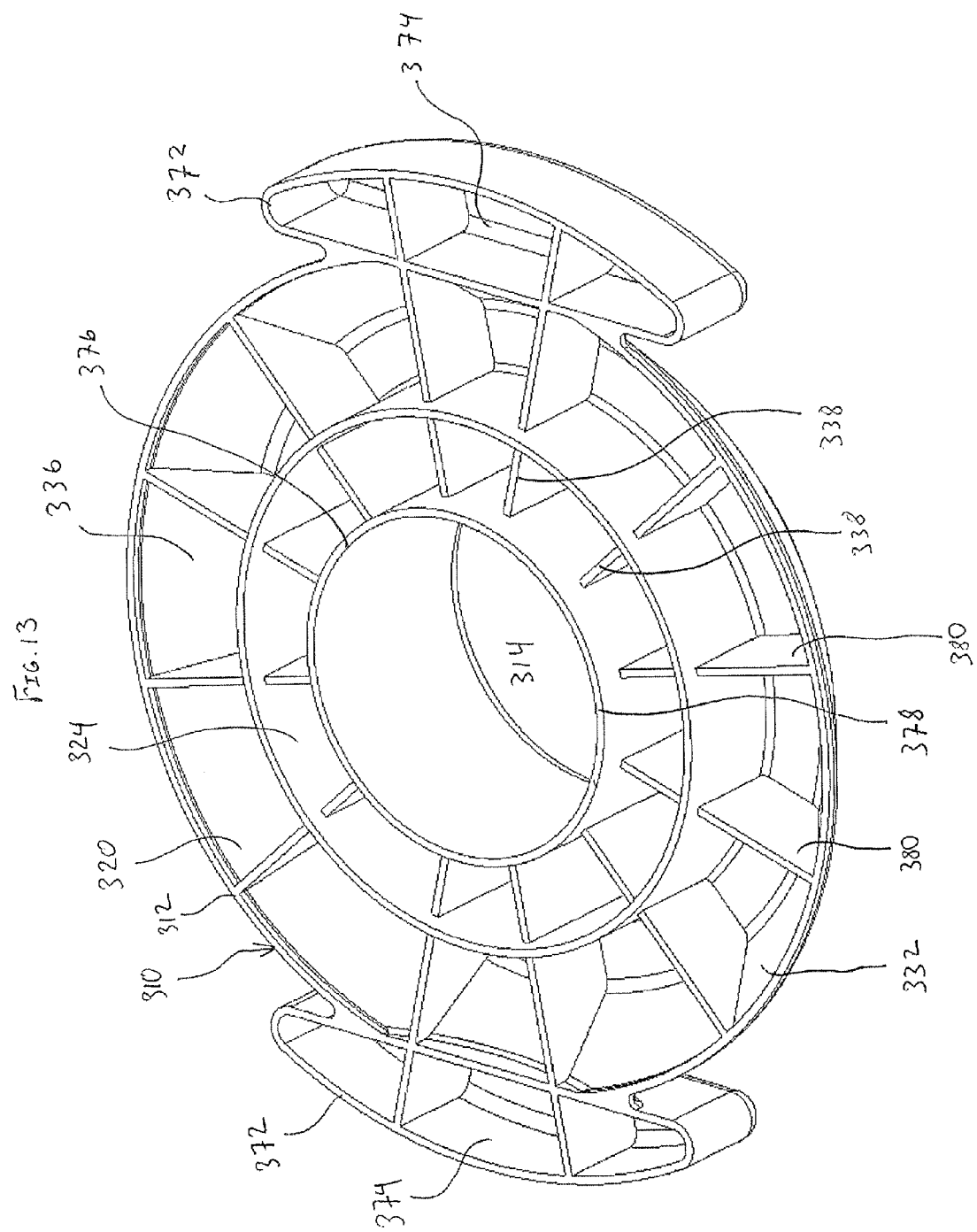
FIG. 13 is a perspective view showing an opposite surface of the basket of FIG. 12.
Figure 14:
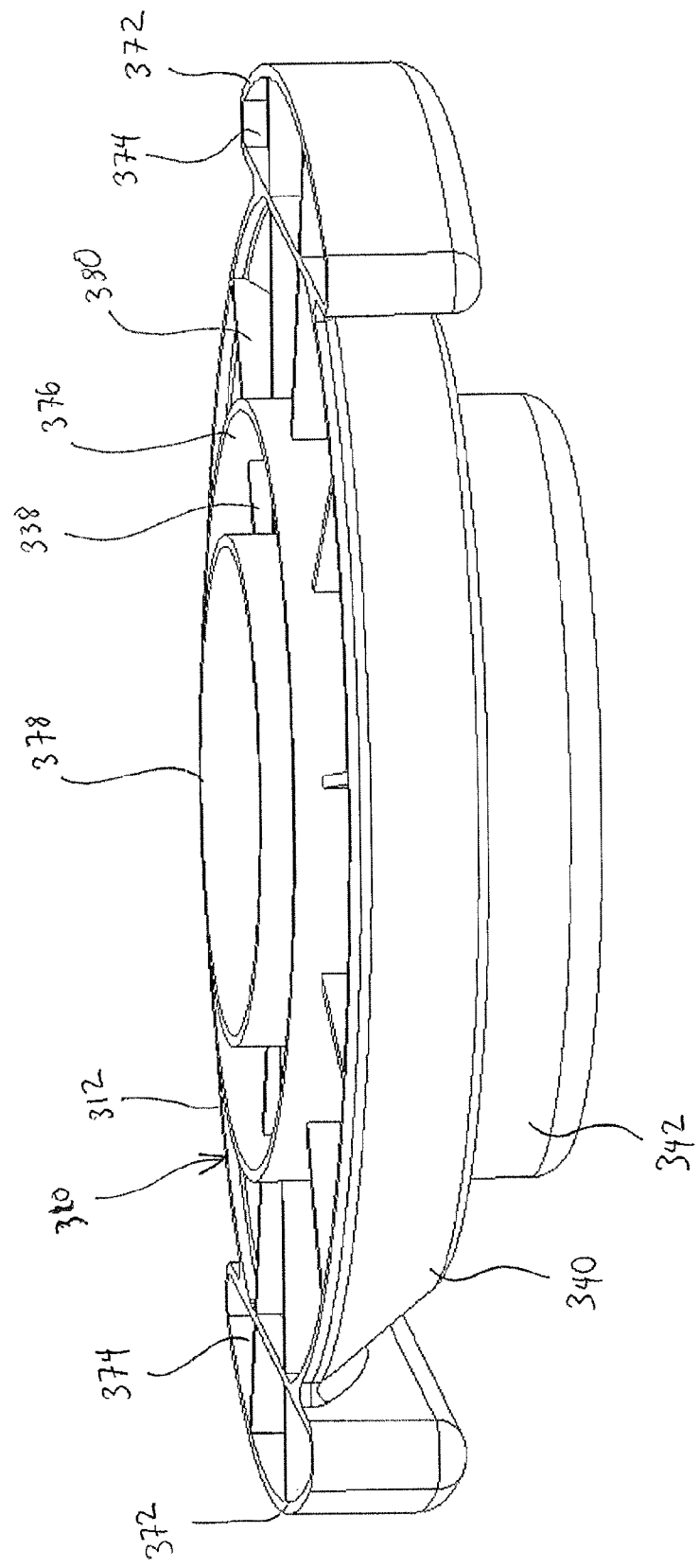
FIG. 14 is a perspective view showing a side profile of the basket of FIG. 12.

FIGS. 12-14 illustrate a basket 310 constructed according to a third exemplary embodiment of the present invention. With reference to FIGS. 12 and 13, the basket 310 includes an annular body 312 having a retainer side 316 and an additive storage side 320. An opening 314 extends through the annular body 312 and is concentric with the annular body 312.

With reference to FIG. 12, the retainer side 316 of the annular body 312 includes a radially outer annular portion 340 extending to a first depth and a radially inner annular portion 342 extending to a second depth. The radially inner annular portion 342 is proximate to the opening 314. A pair of diametrically opposed auxiliary wings 372 is disposed on the outer circumference of the annular body 312.

With reference to FIG. 13, the additive storage side 320 includes a radially inner recess 324, a radially outer recess 336 and an auxiliary recess 374 disposed in each auxiliary wing 372. The radially inner recess 324 is separated from the radially outer recess 336 by a circumferentially extending partition 376 that is concentric with the annular body 312 and the opening 314. An inner wall 378 separates the radially inner recess 324 from the opening 314. Thus, the radially inner recess 324 is formed between the inner wall 378 and the partition 376. A plurality of radially extending, circumferentially spaced flanges 338 is positioned in the radially inner recess 324. The flanges 338 extend between the inner wall 378 and the partition 376 and divide the radially inner recess 324 into a plurality of radially inner sub-recesses.

The radially outer recess 336 is formed between an outer wall 332 of the annular body 312 and the partition 376. The radially outer recess 336 includes a plurality of radially extending, circumferentially spaced flanges 380. The flanges 380 divide the radially outer recess 336 into a plurality of radially outer sub-recesses. In an exemplary embodiment, the flanges 380 of the radially outer recess 336 are aligned with the flanges 338 of the radially inner recess 324. However, other configurations are envisioned.

The radially outer recess 336 has a first depth that generally corresponds to the first depth of outer annular portion 340 shown in FIG. 12. The radially inner recess 324 has a second depth that generally corresponds to the second depth of the inner annular portion 342 shown in FIG. 12. In an exemplary embodiment, the second depth of the inner recess 324 is greater than the first depth of the outer recess 336.

The auxiliary wings 372 are disposed along the outer circumference of the annular body 312. Each auxiliary wing 372 includes an auxiliary recess 374. Each auxiliary recess 374 includes at least one flange 382 disposed therein, extending in a radial direction of the annular body 312, to divide the auxiliary recess 374 into a plurality of sub-recesses. The auxiliary wings 372 and corresponding auxiliary recesses 374 are configured to store additive material 122 to supplement the additive material 122 stored by the radially outer recess 336 and radial inner recess 328 of the annular body 312. In an exemplary embodiment, the auxiliary wings 372 may make use of additional space in a filter assembly 140 to store more additive material 122.

With reference to FIG. 14, the flanges 382 of the auxiliary recesses 374, radially outer recess and radially inner recess may extend in an axial direction and terminate generally in a first plane. The partition 376 and inner wall 378 may extend in an axial direction beyond the first plane. In an exemplary embodiment, the inner wall 378 may extend beyond the partition 376 in the axial direction.

Figure 15:
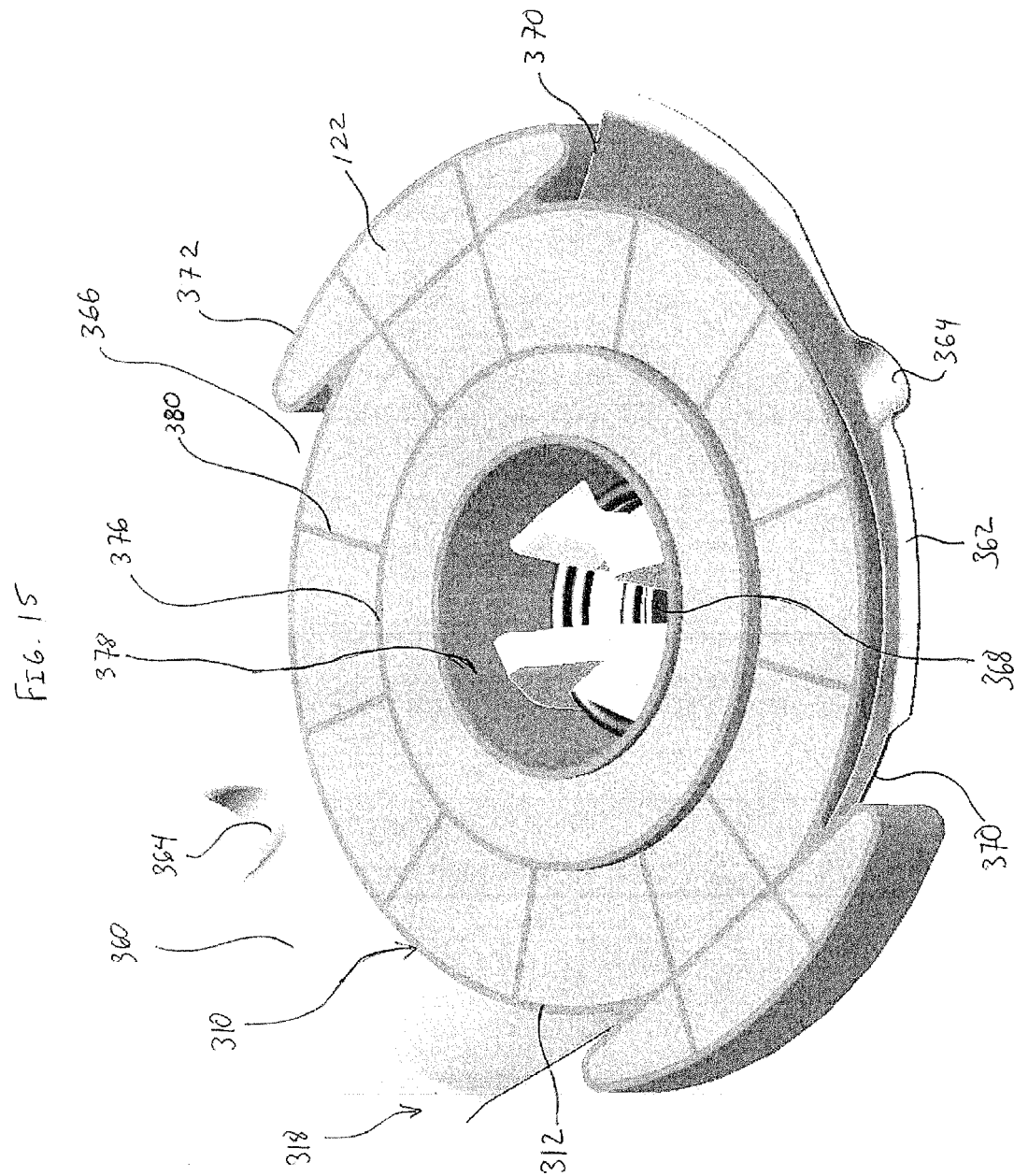
FIG. 15 is a perspective view of the basket of FIG. 12 assembled with a retainer according to the third exemplary embodiment of the present invention.
Figure 16:
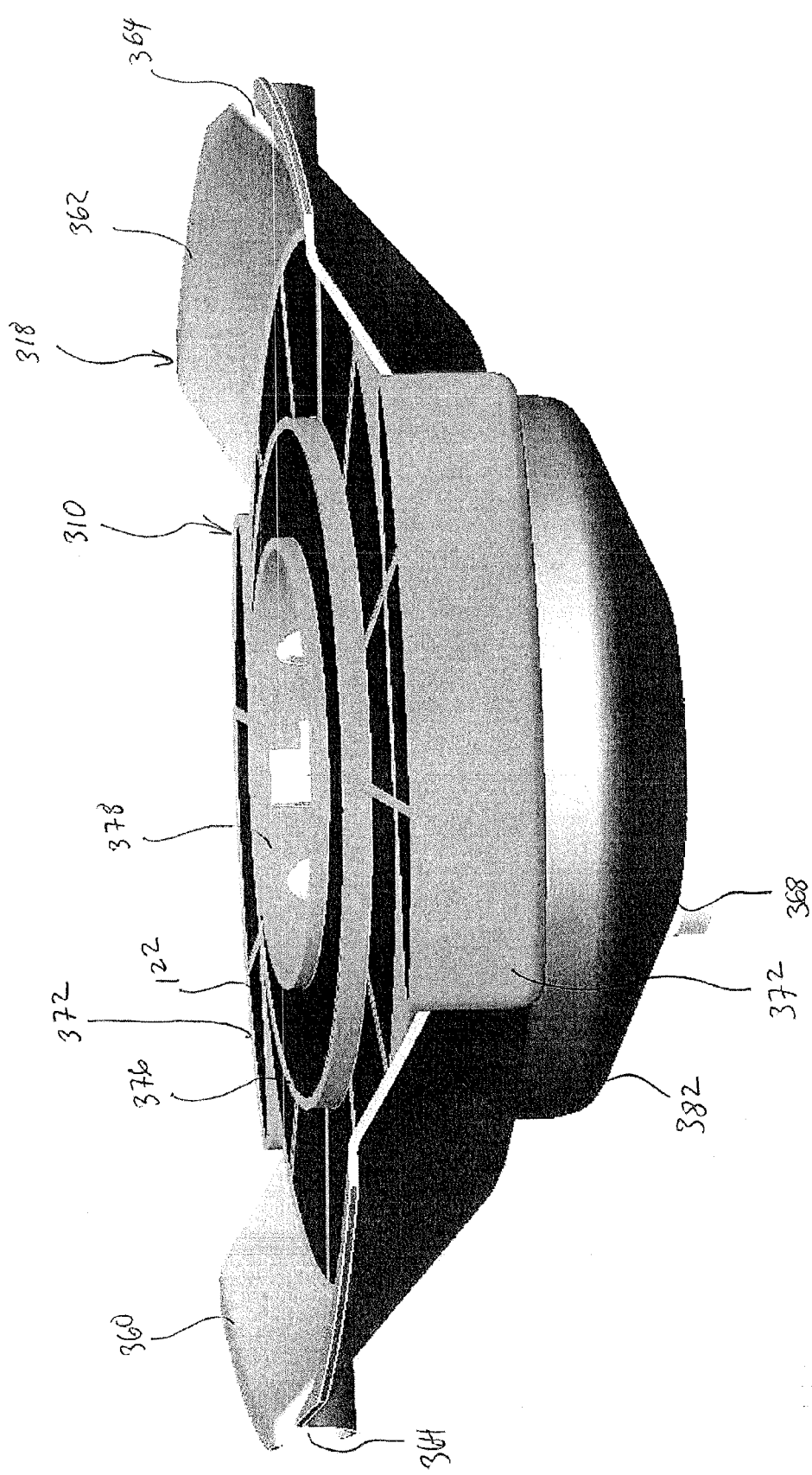
FIG. 16 is a perspective view showing a side profile of the basket of FIG. 12 assembled with a retainer according to the third exemplary embodiment of the present invention.

FIGS. 15 and 16 illustrate the basket 310 of FIGS. 12-14 having the additive material 122 stored therein, together with a retainer 318. The retainer 318 includes a first end 360 and a second end 362 positioned oppositely of the first end. Two sides 370 extend between the first end 360 and second end 362. In an exemplary embodiment, the two sides may be parallel with one another. Each end 360, 362 includes a depression 364 which may be used for handling of the retainer 318. The retainer 318 extends to a depth between the first end 360 and second end 362 to form a partial cup or bowl shape 366. Further, the retainer 318 includes an annular depression 384 formed in a central region of the retainer 318 between the first end 360 and second end 362. The annular depression 382 defines a retainer aperture 368 concentric with the annular depression 384.

The basket 310 may be seated in the cup or bowl shaped portion 366 and in the annular depression 384. In an exemplary embodiment, the inner annular portion 342 of the basket 310 may be positioned in the annular depression 384 of the retainer 318 and the outer annular portion 340 of the basket 310 may be positioned in the cup or bowl shaped portion 366 of the retainer 318. The auxiliary wings 372 of the basket 310 may extend beyond the two sides 370 of the retainer 318 between the first end 360 and second end 362.

Figure 17:
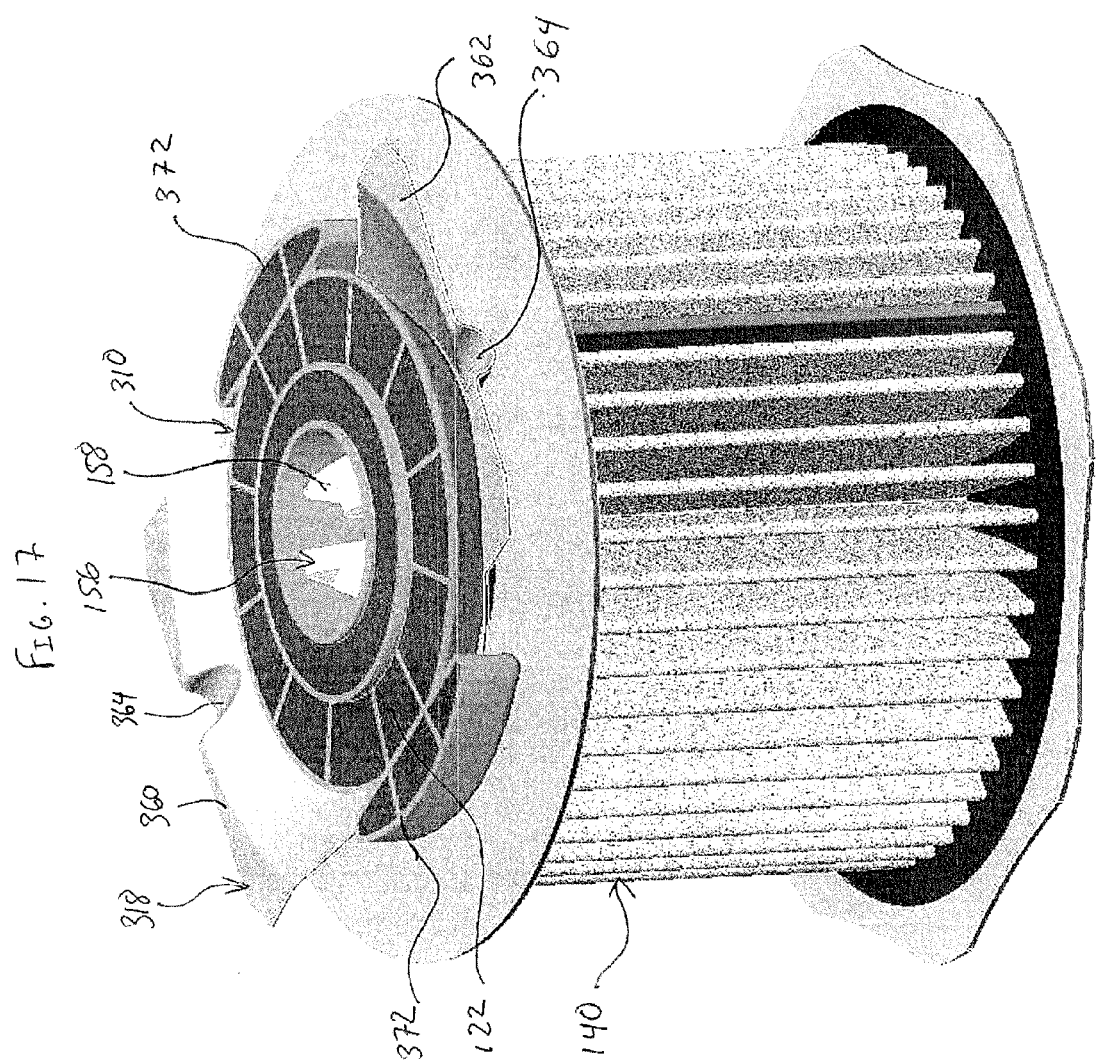
FIG. 17 is a perspective view showing the basket of FIG. 12 assembled with a retainer and a filter assembly according to the third exemplary embodiment of the present invention.

FIG. 17 illustrates the basket assembly together with the filter assembly 140. In an exemplary embodiment, the filter assembly 140 may the same as the filter assembly 140 described above. Accordingly, in the description of this exemplary embodiment, reference is made to the filter assembly 140 based on the description above. However, it is understood that the basket 310 and retainer 318 may be used together with other suitable filter assemblies.

With the basket 310 and retainer 318 assembled with the filter assembly 140, the opening 314 of the basket 310, the aperture 368 of the retainer 318, and the central opening 148 of the filter assembly 140 are concentrically aligned. A portion of the retainer 318 and/or basket 310 may be received within the central opening 148 of the filter assembly 140. The legs 158 of the relief valve 156 extend through the aperture 368 of the retainer 318 and into the opening 314 of the basket 310.

Further, with reference to FIGS. 15-17, an additive material 122 may be received in the recesses 324, 336, 374 of the basket 310. In an exemplary embodiment, in the auxiliary wings 372 and radially outer recess 336, additive material 122 may be received up to a height of the flanges 380, 382. However, in the radially inner recess 324, additive material 1221 may be received up to a height greater than the height of the flanges 380, 382 due to the height of the partition 376 and inner wall 378.

Figure 18:
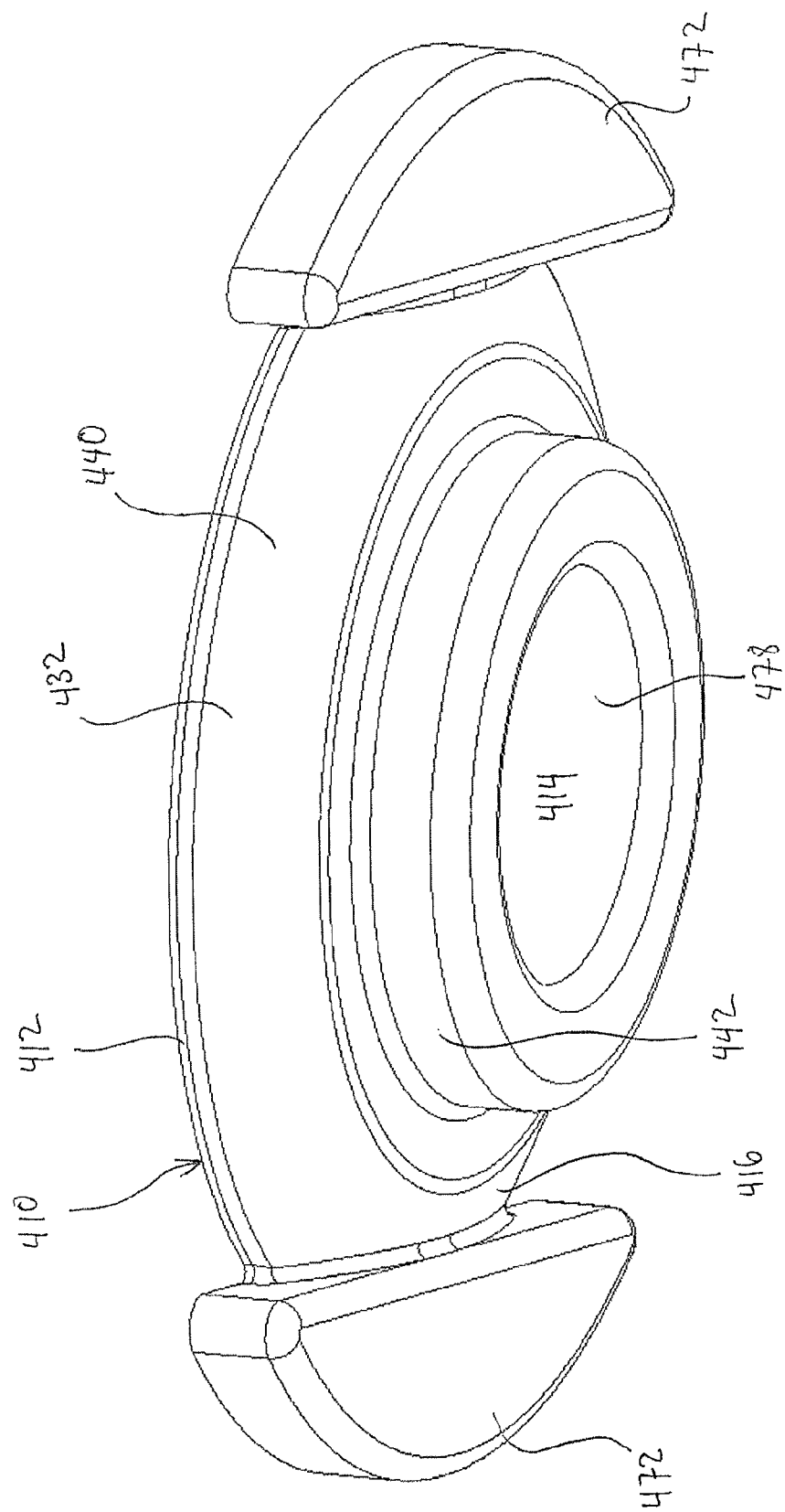
FIG. 18 is a perspective view showing one surface of a basket according to a fourth exemplary embodiment of the present invention.
Figure 19:
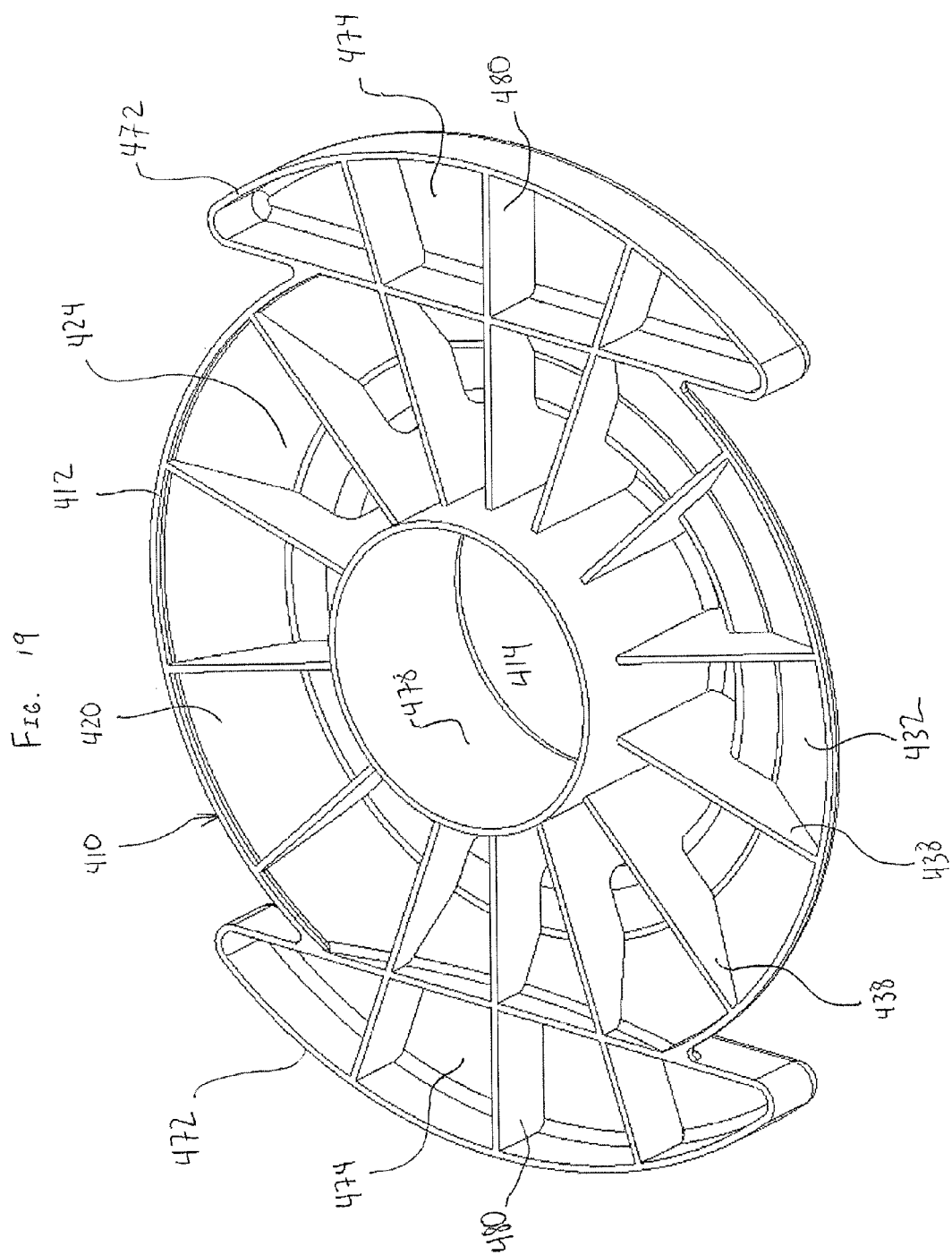
FIG. 19 is a perspective view showing an opposite surface of the basket of FIG. 18.
Figure 20:
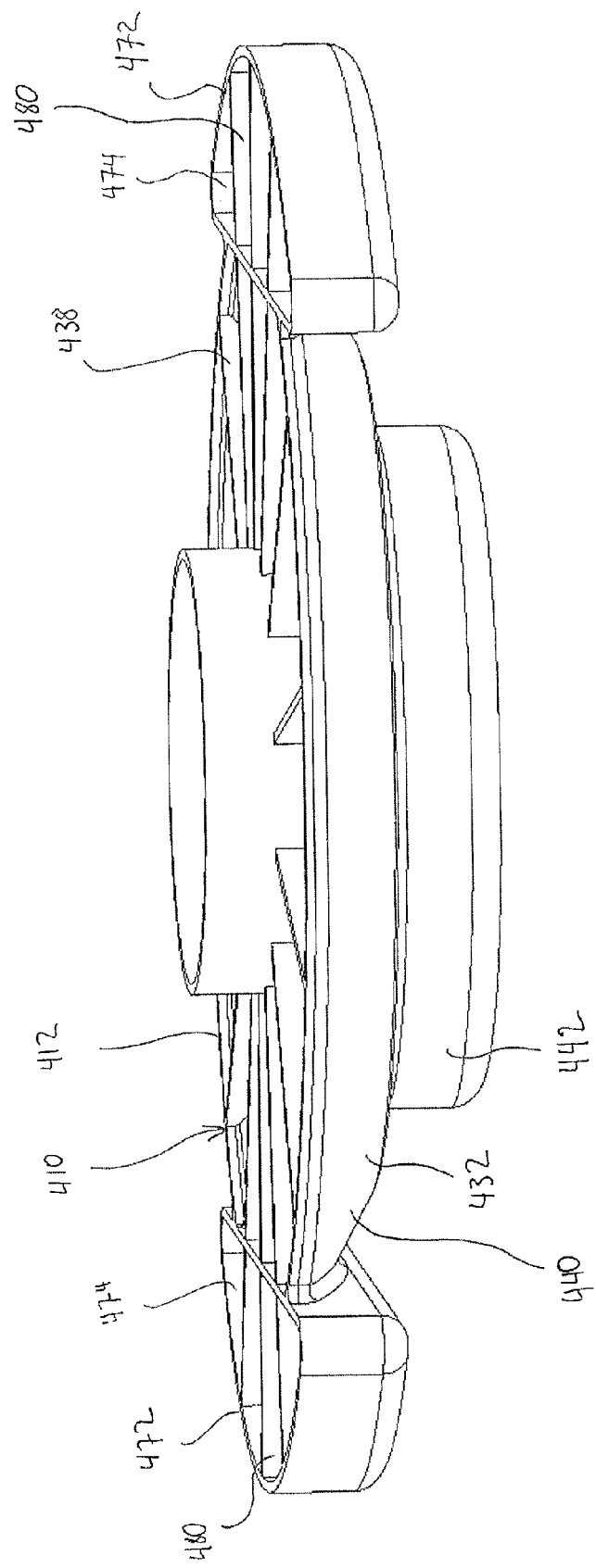
FIG. 20 is a perspective view showing a side profile of the basket of FIG. 18.

FIGS. 18-20 illustrate a basket 410 constructed according to a fourth exemplary embodiment of the present invention. With reference to FIGS. 18-20, the basket 410 includes an annular body 412 having a retainer side 416 (FIG. 18) and an additive storage side 420 (FIG. 19). The annular body 412 includes a concentric opening 414 extending therethrough.

With reference to FIG. 18, the retainer side 416 of the annular body 412 includes a radially outer annular portion 440 having a first depth and a radially inner annular portion 442 having a second depth. The second depth is greater than the first depth. An inner wall 478 having an axial length surrounds the opening 414. The radially inner annular portion 442 is proximate to the opening 414. A pair of diametrically opposed auxiliary wings 472 is disposed on the outer circumference of the annular body 412.

With reference to FIG. 19, the additive storage side 420 includes a recess 424 having a varying depth. The varying depths correspond to the first depth of the radially outer annular portion 440 and the second depth of the radially inner annular portion 442 of the annular body 412 as described above. The recess 424 is defined generally between an outer wall 432 of the annular body 412 and the inner wall 478 surrounding the opening 414.

A plurality of flanges 438 is disposed in the recess 424 and extends radially between the inner wall 478 and an inner surface of the outer wall 432 of the annular body 412. The flanges 438 are spaced circumferentially to form a plurality of sub-recesses within the recess 424. A side of the respective flanges 438 facing the annular body 412 presents a profile that generally corresponds to a profile of the recess 424 defined by the varying depths. Another side of the respective flanges 438 facing away from the annular body 412 and recess 424 terminate generally at a first plane. That is, the flanges 438, in one direction, extend to substantially the same axial position.

With further reference to FIG. 19, auxiliary wings 472 are disposed along an outer circumference of the annular body 412. In an exemplary embodiment, the auxiliary wings 472 are disposed diametrically opposite from each other. Each auxiliary wing 472 includes an auxiliary recess 474. Each auxiliary wing 472 further includes at least one flange 482 extending through the recess 474 in a radial direction of the annular body 412. The at least one flange 482 divides the auxiliary recess 474 into a plurality of auxiliary sub-recesses. The at least one flange 482 in each auxiliary wing 472 may be aligned with a corresponding flange 438 in the recess 424 of the annular body 412.

With reference to FIG. 20, the inner wall 478 may extend axially beyond the first plane where the side of the respective flanges 438 facing away from the annular body 412 terminates. In an exemplary embodiment, as shown in FIGS. 21 and 22, for instance, an additive material 122 may be stored in the sub-recesses of the recess 424 and the auxiliary recess 474 and filled to level corresponding to the height of the flanges 438, 482, i.e., to the first plane.

Figure 21:
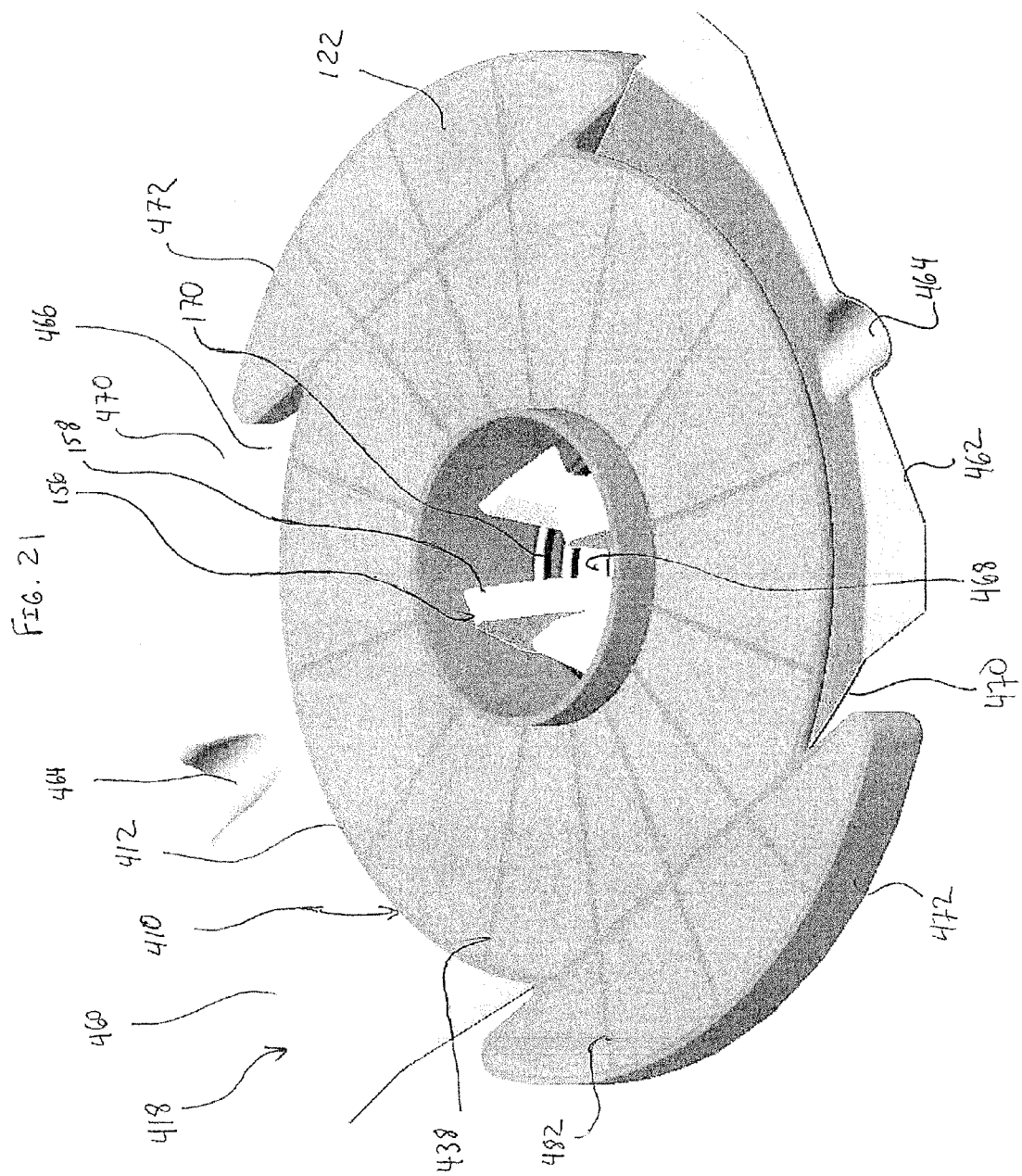
FIG. 21 is a perspective view of the basket of FIG. 18 assembled with a retainer according to the fourth exemplary embodiment of the present invention.

FIG. 21 illustrates the basket 410 of FIGS. 18-20 having an additive material 122 stored therein, together with a retainer 418. The retainer 418 includes a first end 460 and a second end 462 positioned oppositely from each other. Each of the first end 460 and second end 462 include a depression 464 formed therein which may be used in handling of the retainer 418. Two sides 470 extend between the first end 460 and second end 462. In an exemplary embodiment, the two sides may be parallel to each other. The two sides 470 are arced to extend in a depth direction, such that the retainer 418 extends to a depth between the first end 460 and second end 462 to form a partial cup or bowl shape 466. Further, the retainer 418 may include an annular depression (not shown) similar to the annular depression 384 of the retainer shown in FIG. 16. The annular depression may be formed in a central region of the retainer 418 between the curved ends 460, 462. The retainer also includes a retainer aperture 468 concentric with the recess 424 and annular depression.

The basket 410 may be seated in the cup or bowl shaped portion 466 and/or in the annular depression. In an exemplary embodiment, the inner annular portion 442 of the basket 410 may be positioned in the annular depression of the retainer 418 and the outer annular portion 440 of the basket 410 may be positioned in the cup or bowl shaped portion 466 of the retainer 418. The auxiliary wings 472 of the basket 410 may extend beyond a respective side of the two sides 470 of the retainer 418 between the first end 460 and second end 462.

Figure 22:
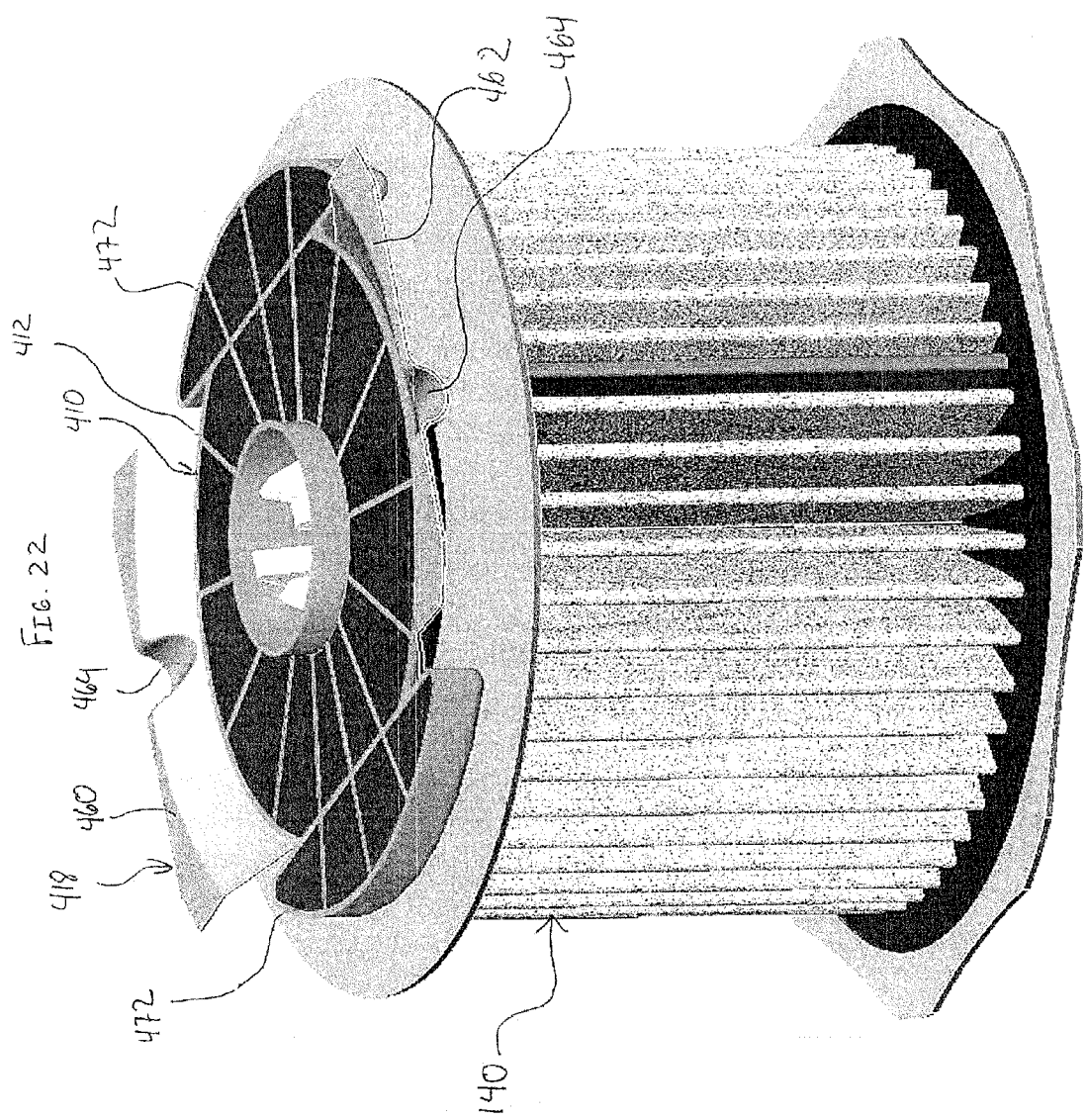
FIG. 22 is a perspective view showing the basket of FIG. 18 assembled with a retainer and a filter assembly according to the fourth exemplary embodiment of the present invention.

FIG. 22 illustrates the basket 410 and retainer 418 assembled together with a filter assembly 140 according to an exemplary embodiment of the present invention. With the basket 410 installed, the opening 414 of the annular body 412, aperture 468 of the retainer 418, and the central opening 148 of the filter assembly 140 are concentrically aligned. A portion of the retainer 418 may be received within the central opening 148 of the filter assembly 140. The legs 158 of the relief valve 156 extend through the aperture 468 of the retainer 418 and into the opening 414 of the basket 410. A spring 170 may be positioned about the legs of the relief valve 156 within the aperture 468 and opening of the retainer 418 and the basket 410, respectively.

FIGS. 23-29 are directed to additional exemplary embodiments of the basket for storing an additive material in a spin-on filter. It is understood that these baskets may be used with the retainer and filter structures described above.

Figure 23:
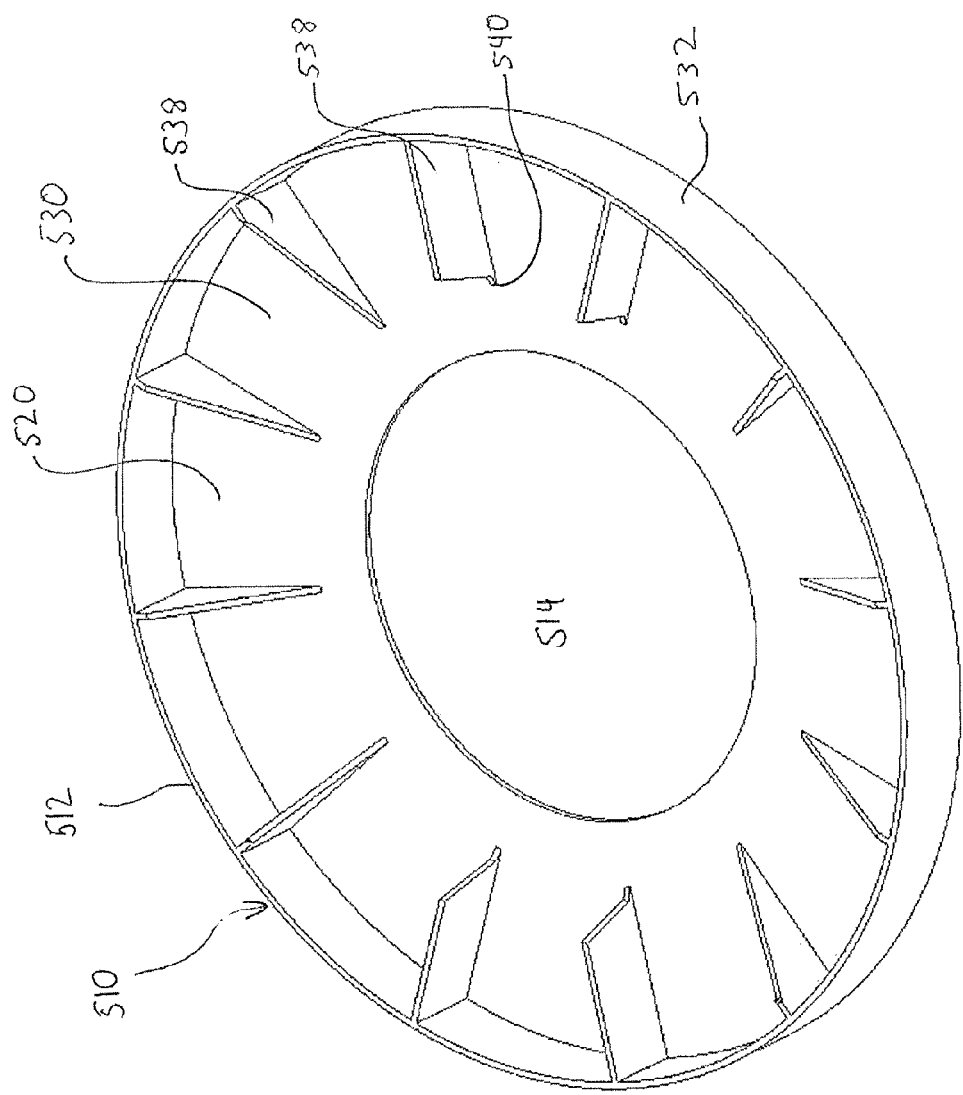
FIG. 23 is a perspective view showing one side of a basket according to a fifth exemplary embodiment of the present invention.
Figure 24:
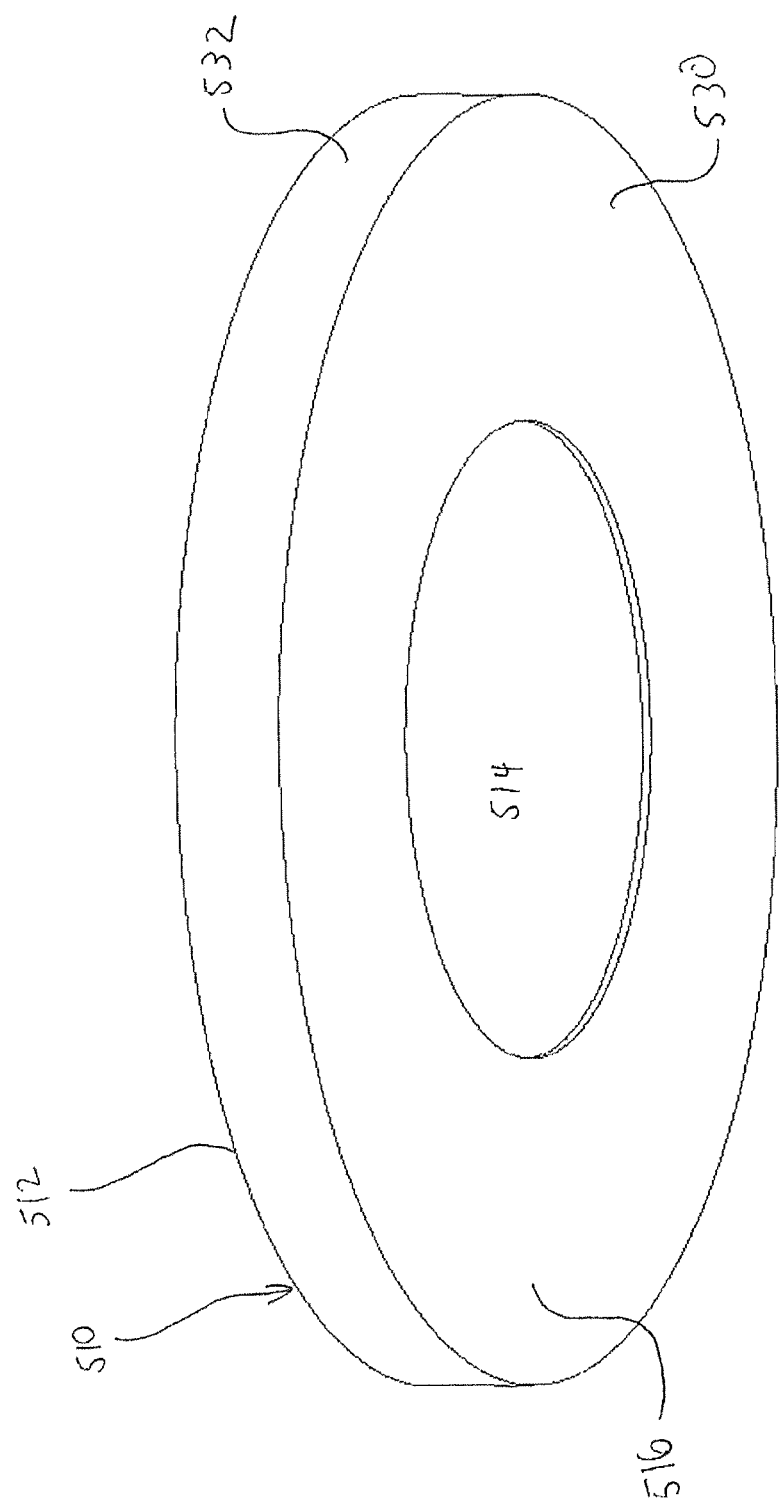
FIG. 24 is a perspective view an opposite side of the basket of FIG. 23.

FIGS. 23-24 illustrate a basket 510 constructed according to a fifth exemplary embodiment of the present invention. With reference to FIGS. 23 and 24, the basket 510 includes an additive storage side 520 (FIG. 23) and a retainer side 516 (FIG. 24). The basket 510 is formed as an annular body 512 and includes an opening 514 that is concentric with the annular body 512.

FIG. 23 shows the additive storage side 520 of the basket 510. The annular body 512 includes an annular plate 530 in which the opening 514 is formed and a retaining wall 532 extending in an axial direction about the circumference of the annular plate 530. The retaining wall 532 and annular plate 530 form a recess 524 configured to receive and store an additive material (not shown). A plurality of flanges 538 is formed within the recess 524 and extends from the retaining wall 532 radially inward toward a center of the basket 510. In an exemplary embodiment, the flanges 538 extend partially from the retaining wall 532 to the opening 514. That is, in an exemplary embodiment, the flanges 538 do not extend all the way from the retaining wall 532 to the opening 514.

In addition, individual flanges 538 of the plurality of flanges may be configured differently. For example, some flanges 538 may be generally rectangular in shape. In an exemplary embodiment, these flanges 538 may include a projection 540 from the rectangular shape at a position proximate to the annular plate 530. Other flanges 538 of the plurality of flanges may be shaped generally as a triangle or a trapezoid. However, it is understood that the shapes of the flanges 538 are not limited to these examples.

FIG. 24 illustrates the retainer side 516 of the basket 510. Here, the basket 510 is generally cylindrical in shape, formed by the annular plate 530 and retaining wall 532. The opening 514 extends through a thickness of the annular plate. The basket 510 of this exemplary embodiment may be used together with a retainer and filter assembly described above.

Figure 25:
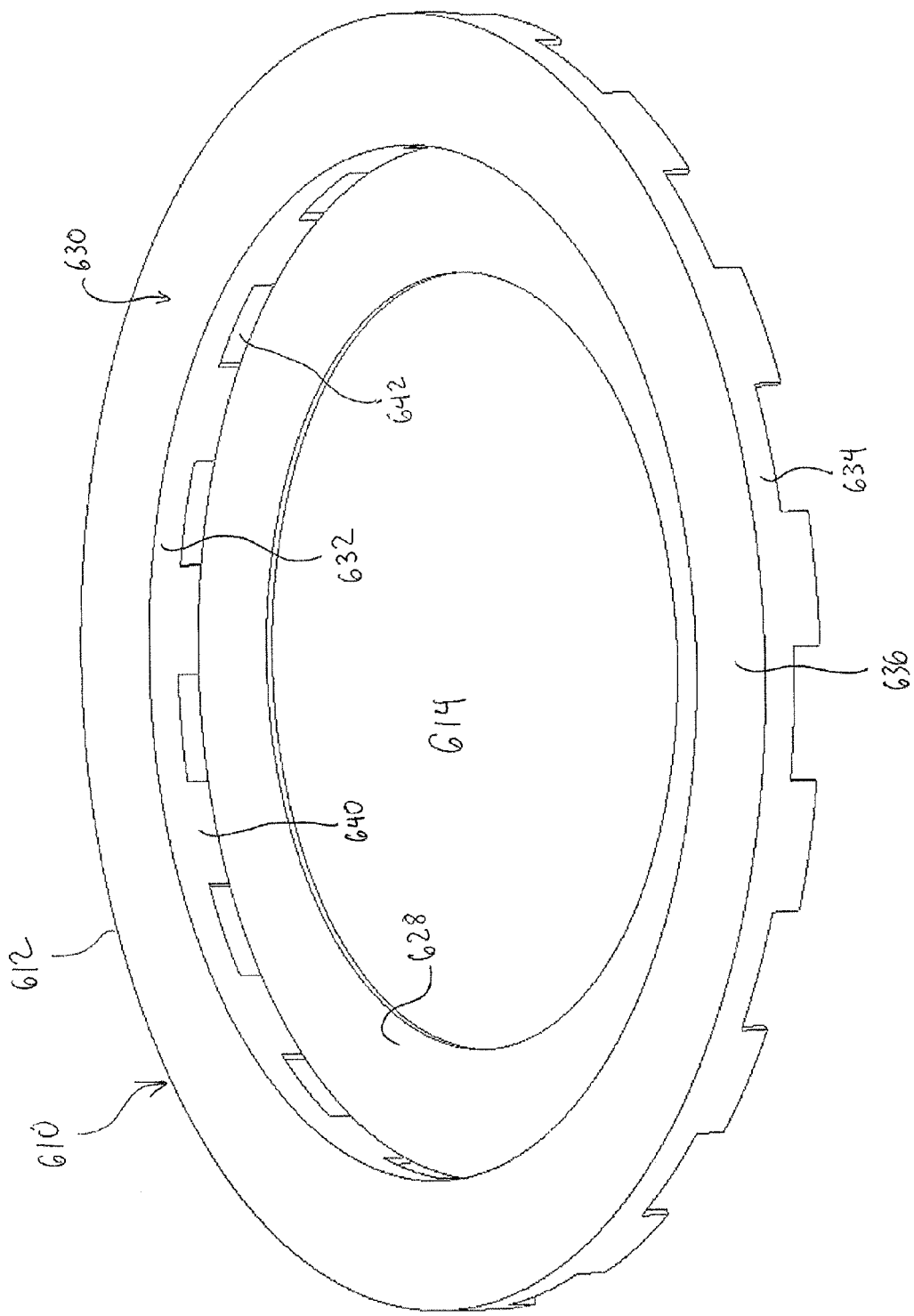
FIG. 25 is a perspective view of one side of a basket according to a sixth exemplary embodiment of the present invention.
Figure 26:
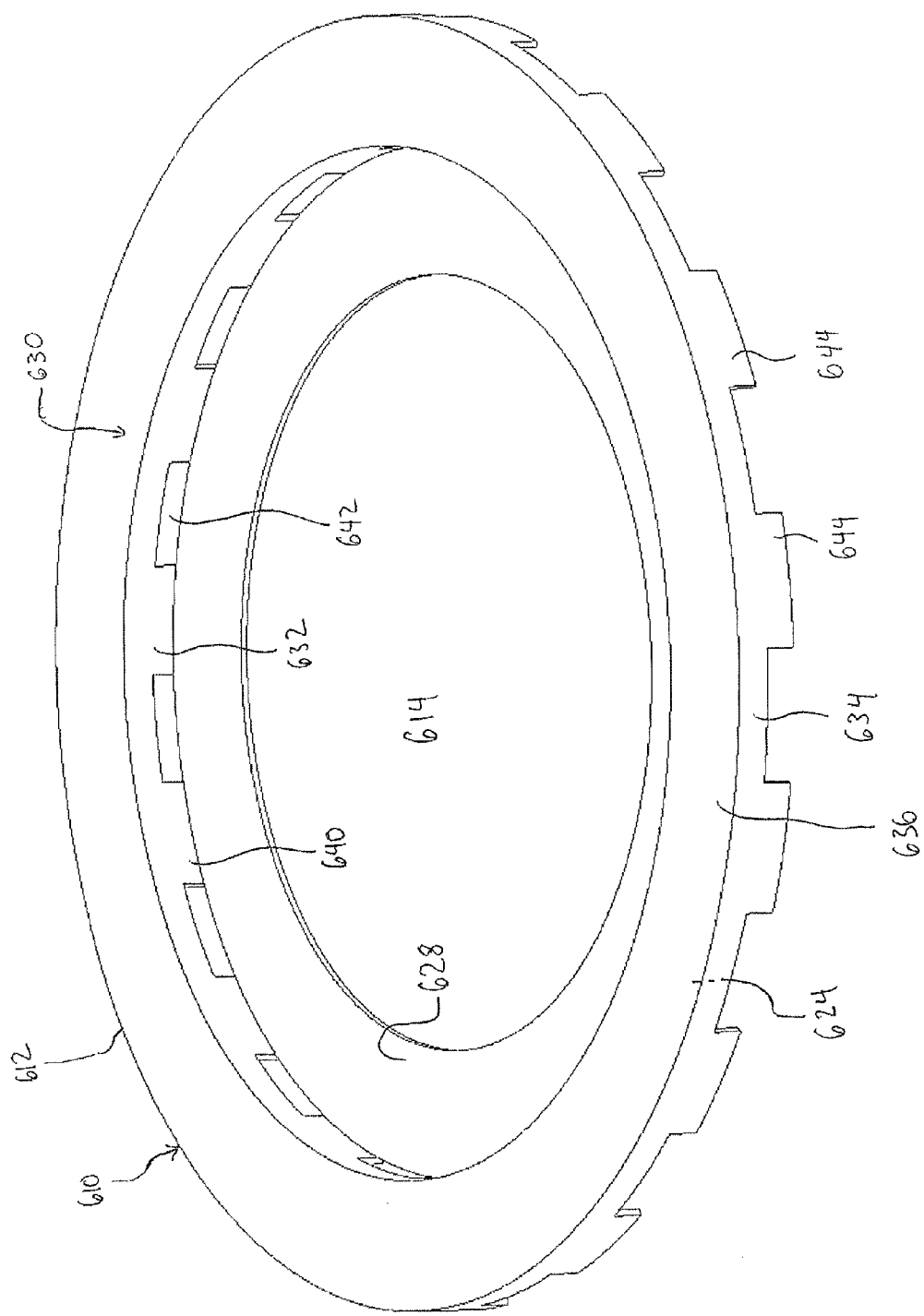
FIG. 26 is a perspective view of the basket of FIG. 25 showing hidden surfaces according to the sixth exemplary embodiment of the present invention.

FIGS. 25 and 26 illustrate a basket 610 constructed according to a sixth exemplary embodiment of the present invention. The basket 610 is in the form of an annular body 612. The annular body 612 includes an inner annular plate 628 defining a concentric opening 614 extending therethough. The annular body 612 further includes an outer annular retaining portion 630 positioned along the outer circumference of the inner annular plate 628.

The outer annular retaining portion 630 includes an inner wall 632, outer wall 634 and connecting wall 636. The connecting wall 636 is spaced in an axial direction from the inner annular plate 628. The inner wall 632 extends in the axial direction along a radially inner circumference of the connecting wall 636. The inner wall 632 includes a plurality of projections 640 extending in the axial direction to the inner annular plate 628, thereby connecting the annular retaining portion 630 to the inner annular plate 628. The projections 640 extend from a first axial position to a second axial position. In an exemplary embodiment, the projections 640 of the inner wall 632 may be equally spaced apart in the circumferential direction. A space between respective projections 640 of the inner wall forms a vent 642.

The outer wall 634 extends in the axial direction along a radially outer circumference of the connecting wall 636. The outer wall 634 includes a plurality of projections 644 extending in the axial direction. The projections extend from the first axial position to the second axial position. In an exemplary embodiment, the projections of the outer wall are equally spaced apart in the circumferential direction. In addition, each projection 644 of the outer wall may be radially aligned with a respective projection 640 of the inner wall 632. Accordingly, a vent 646 formed between the projections 644 of the outer wall 634 may correspond to respective vents 642 formed between the projections 640 of the inner wall 632.

With reference to FIG. 26, a plurality of flanges 638 may extend radially between the inner wall 632 and the outer wall 634. In one exemplary embodiment, the flanges 638 extend between the projections 644 of the outer wall 634 and the projections 640 of the inner wall 632. In this embodiment, the flanges 638 are spaced apart equally in the circumferential direction. Further, the flanges 638 extend axially from the connecting wall 636 to the second axial position between the projections 640, 644 of the inner wall 632 and outer wall 634.

It is understood that the examples above are non-limiting. For example, the projections 640, 644 of the inner wall 632 and outer wall 634 may extend between different axial positions. That is, the projections 644 of the outer wall 634 are not limited to extending between the same axial extents as the projections 640 of the inner wall 632. Likewise, the flanges 638 are not limited to extend between the axial extents described above. Rather, the projections 640, 644 and flanges 638 may be configured differently depending on the particular application.

The inner wall 632, outer wall 634 and connecting wall 636 define a recess 624 configured to receive and store an additive material (not shown). The basket 610 may be assembled together with a retainer and filter assembly as described in the exemplary embodiments above.

Figure 27:
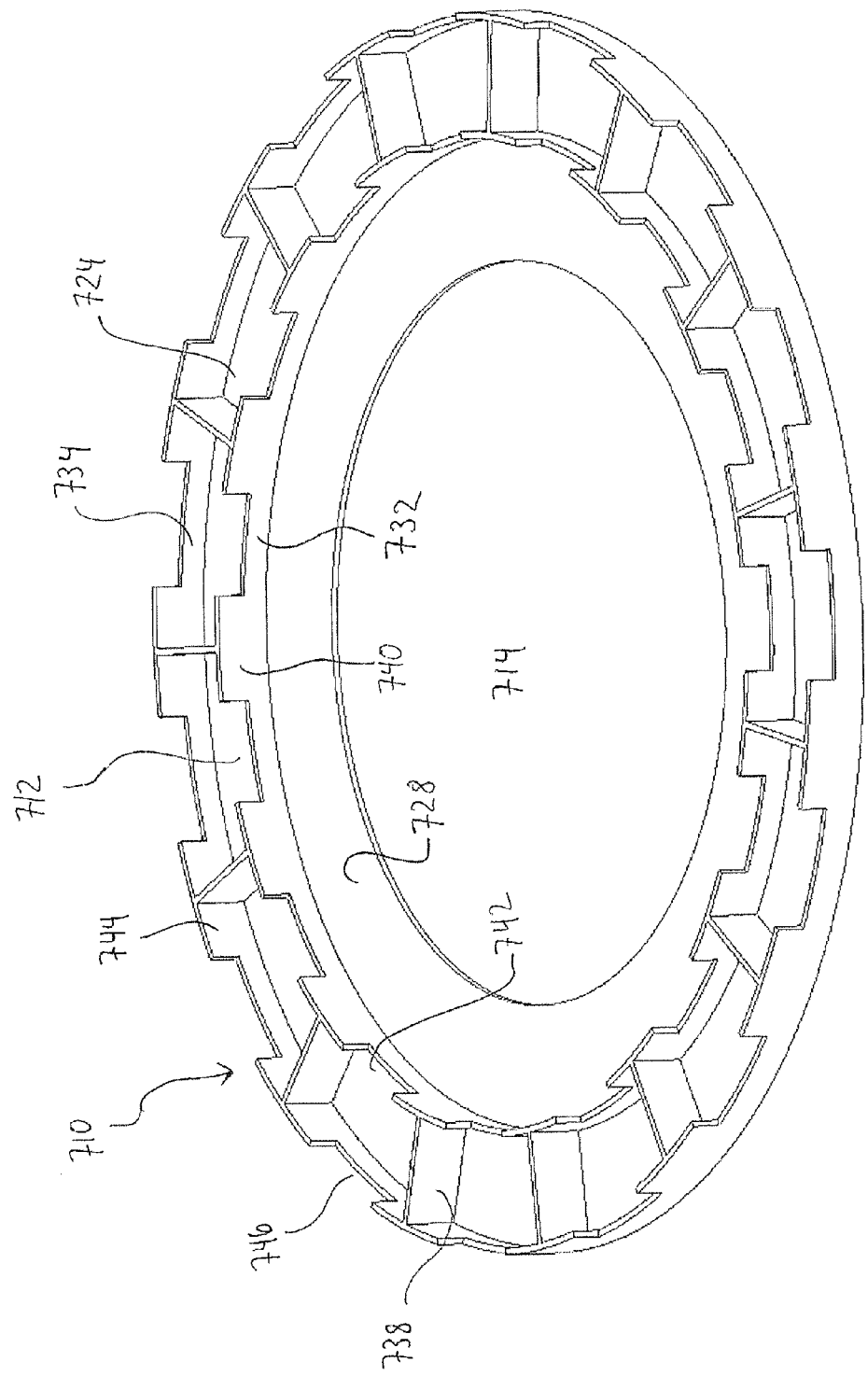
FIG. 27 is a perspective view of a basket according to a seventh exemplary embodiment of the present invention.

FIG. 27 illustrates a basket 710 constructed according to a seventh exemplary embodiment of the present invention. The basket 710 is in the form of an annular body 712 having an opening 714 formed concentrically therein. The annular body 712 includes an annular plate 728 having the opening 714 formed therein. The annular body 712 further includes an inner wall 732 and an outer wall 734.

The outer wall 734 extends around the outer circumference of the annular plate 728 and extends in an axial direction. The outer wall 734 includes a plurality of axial projections 744 spaced circumferentially apart. In an exemplary embodiment, the projections 744 are spaced apart equally. The projections 744 extend from a first axial position to a second axial position. A space between respective projections 744 forms an outer vent 746.

The inner wall 732 extends circumferentially around the annular plate 728 and projects in the axial direction. The inner wall 732 is spaced radially inward from the outer wall 734. The inner wall 732 includes a plurality of axially extending projections 740 spaced apart in the circumferential direction. In an exemplary embodiment, the projections 740 are spaced apart equally. The projections extend from the first axial position to the second axial position. In an exemplary embodiment, the projections 740 of the inner wall 732 are radially aligned with the projections 744 of the outer wall 734. An axially recessed area between two projections forms an inner vent 742.

A plurality of flanges 738 extends radially between the inner wall and outer wall. In an exemplary embodiment, the flanges 738 extend between respective projections of the inner wall and outer wall. The flanges 738 extend axially from the annular plate 728 to the second axial position.

It is understood that the examples above are non-limiting. For example, the projections 740, 744 of the inner wall 732 and outer wall 734 may extend between different axial positions. That is, the projections 744 of the outer wall 734 are not limited to extending between the same axial extents as the projections 740 of the inner wall 732. Likewise, the flanges 738 are not limited to extend between the axial extents described above. Rather, the projections 740, 744 and flanges 738 may be configured differently depending on the particular application.

The inner wall 732, outer wall 734 and annular plate 728 define a recess 724 configured to receive and store an additive material (not shown). The basket 710 may be assembled together with a retainer and filter assembly as described in the exemplary embodiments above.

Figure 28:
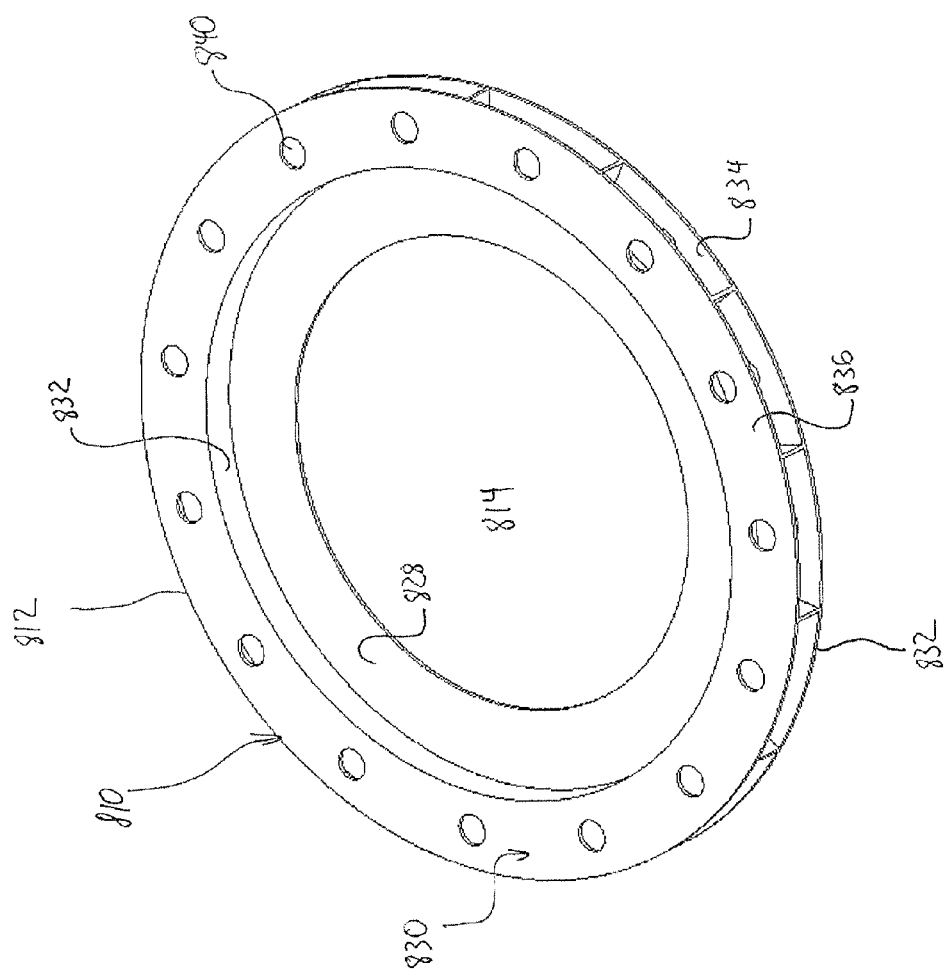
FIG. 28 is a perspective view of one side of a basket according to an eighth exemplary embodiment of the present invention.
Figure 29:
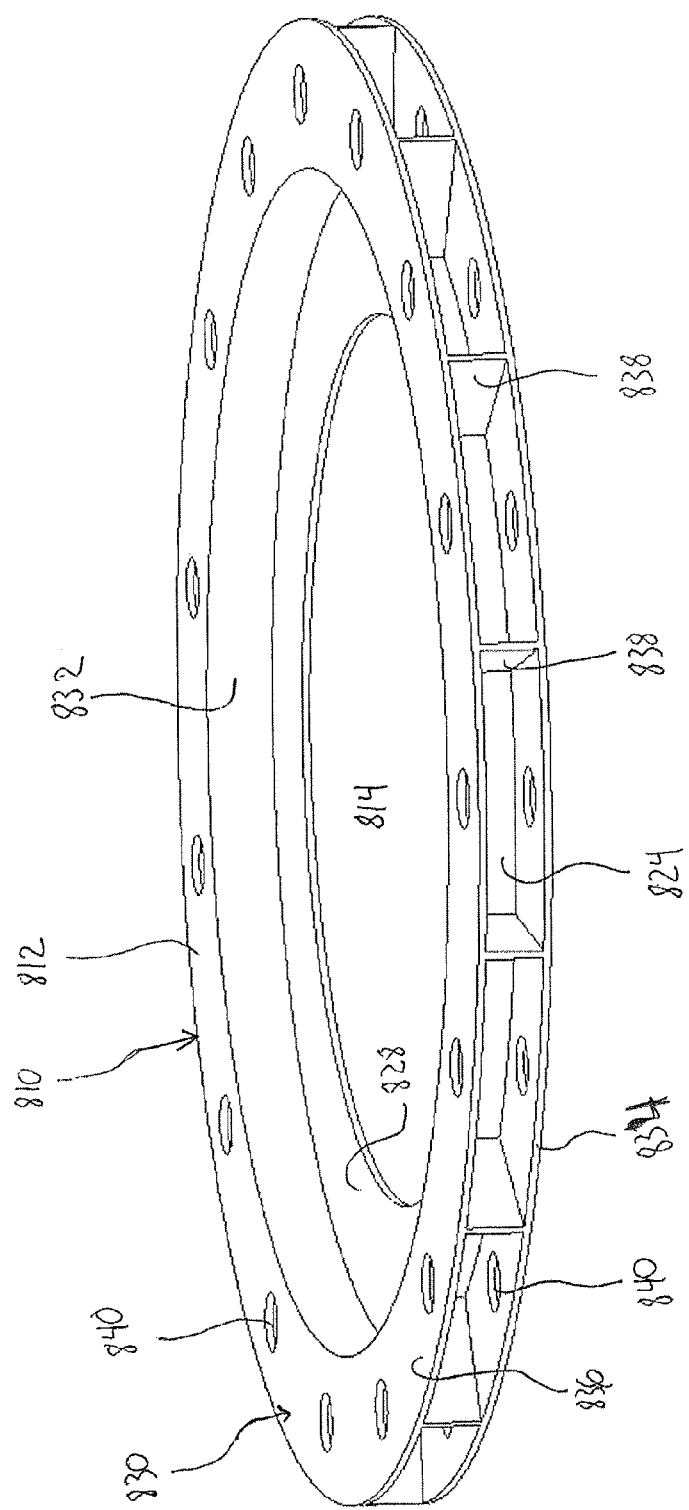
FIG. 29 is a perspective view showing a portion of a side profile of the basket of FIG. 28.

FIGS. 28 and 29 illustrate a basket 810 constructed according to an eighth exemplary embodiment of the present invention. The basket 810 is in the form of an annular body 812. The annular body 812 includes an inner annular plate 828 defining an opening 814 extending therethrough.

The annular body 812 also includes an annular material storage section 830 extending around an outer circumference of the annular plate 828. The storage section 830 includes a first annular plate 834 extending in a radial direction at a same axial position as the inner annular plate 828. In an exemplary embodiment, the first annular plate 834 is formed integrally with the inner annular plate 828. However, the present invention is not limited to such a configuration.

The annular material storage section 830 also includes an axially extending annular retaining wall 832. The retaining wall 832 is positioned along an inner circumference of the first annular plate 834 and extends from a first axial position at the first annular plate to a second axial position. A second annular plate 836 extends radially outward from the retaining wall 832 at the second axial position. In an exemplary embodiment, the first annular plate 834 and second annular plate 836 extend to the same radial position.

With reference to FIG. 29, a recess 824 is formed between the first annular plate 834 and second annular plate 836 that is configured to retain and store the additive material (not shown). The recess 824 is bound at a radially inner side by the retaining wall 832, and is open along a radially outer side.

A plurality of openings 840 is formed in the first annular plate and second annular plate along a circumferential direction of each plate. In an exemplary embodiment, the openings are equally spaced apart in the circumferential direction. Further, the openings 840 of the first annular plate 834 may be aligned with the openings 840 of the other annular plate 836.

A plurality of flanges 838 is disposed within the recess 824. In an exemplary embodiment, each flange 838 extends radially from the retaining wall 832 to a position corresponding with an outer circumference of the first and second annular plates 834. 836. In addition, each flange 838 extends axially from the first annular plate 834 to the second annular plate 836. In one example, the flanges 838 are spaced circumferentially and positioned between the openings 840 of the first 834 and second 836 annular plates in the circumferential direction.

It is understood that the examples above are non-limiting. For example, the axial and radial extents of the retaining wall 832, first annular plate 834, second annular plate 836, and flanges 838 may vary depending on a particular application. The basket 810 may be assembled together with a retainer and filter assembly as described in the exemplary embodiments above.

The carrier assemblies including a basket and retainer according to the exemplary embodiments described above may further include a lid 1000. The lid 1000 may be used with a basket, for example, as described in the embodiments above, to prevent or limit leakage of additive material 122. In particular, the lid 1000 may be used to prevent or limit leakage of additive material 122 during a manufacturing process. For example, the additive material may be heated and become liquefied during the manufacturing process. The orientation of the basket may vary while being handled during the manufacturing process and may be turned on its side or upside down. The lid 1000, in accordance with the exemplary embodiments described below may prevent or limit leakage of the additive material 122 during handling while still allowing for fluid communication with the additive material 122 during operation with a filter assembly 140.

Figure 30:
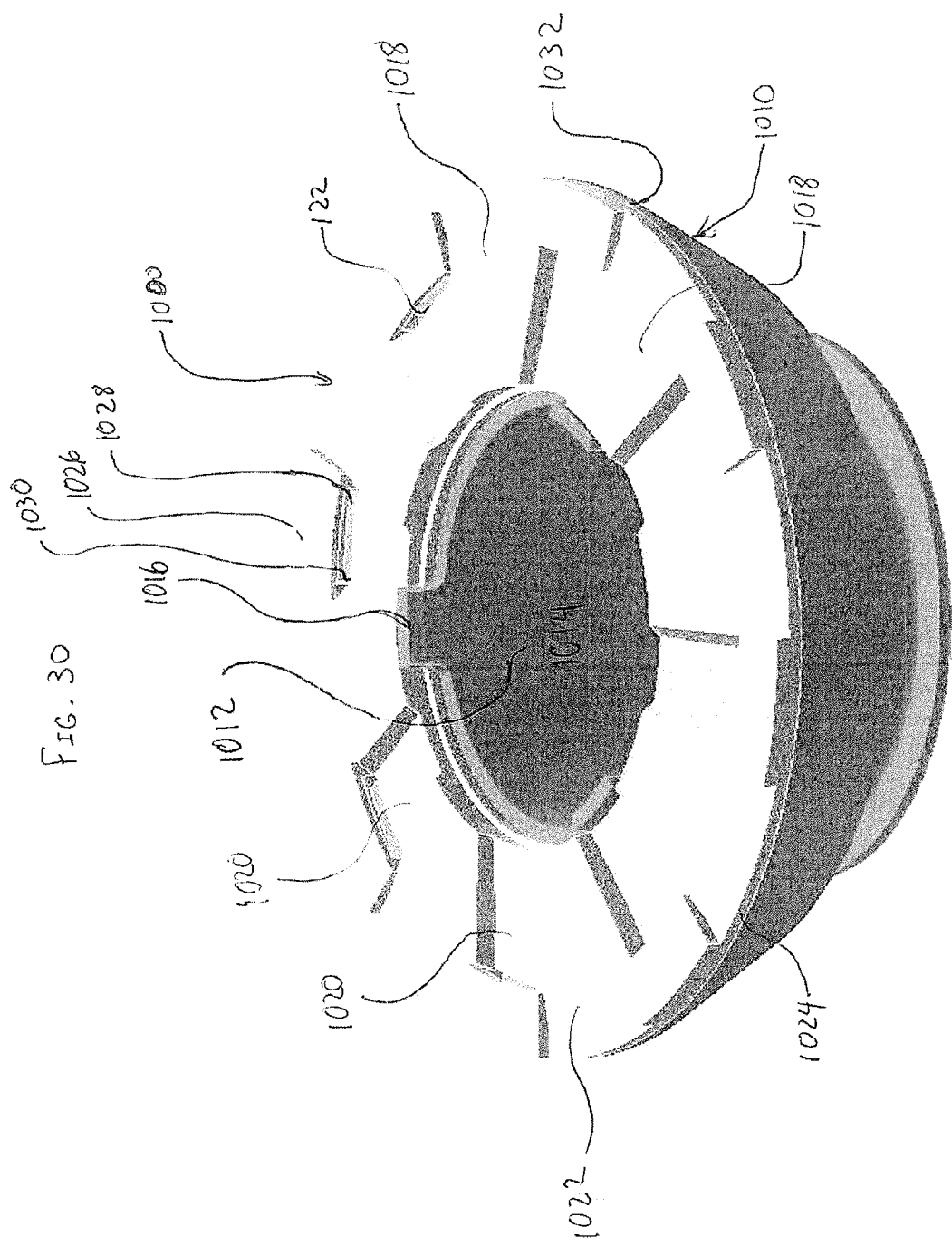
FIG. 30 is a perspective view of a lid constructed in accordance with an exemplary embodiment of the present invention together with a basket.
Figure 31:
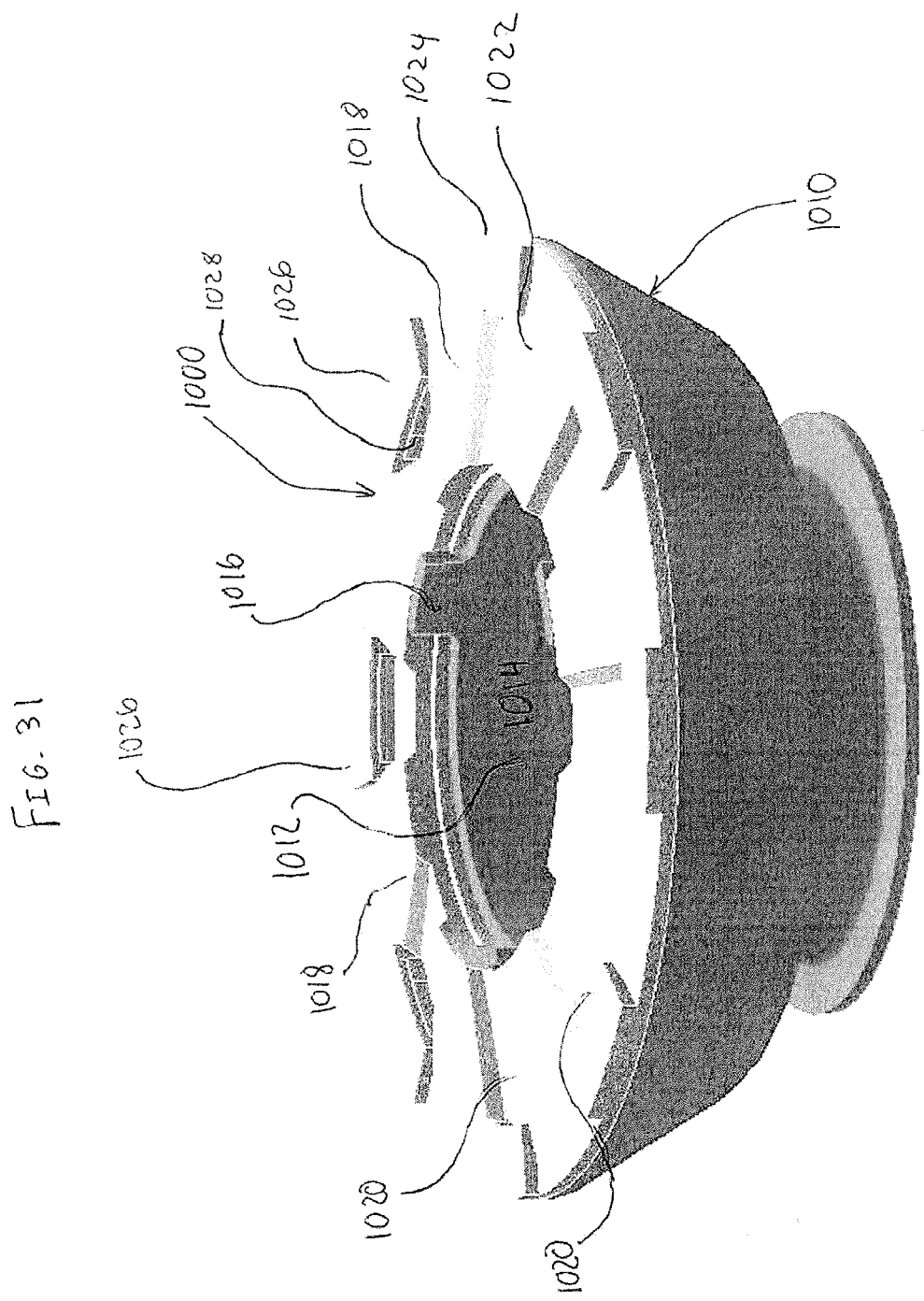
FIG. 31 is a perspective view of the lid of FIG. 30 together with a basket.

FIGS. 30 and 31 illustrate a basket 1010 together with a lid 1000 according an exemplary embodiment of the present invention. The lid 1000 is annular shaped and includes a concentric opening 1012 extending therethrough. The lid 1000 may be installed on the basket 1010 such that the opening 1012 of the lid is concentric with an opening 1014 of the basket 1010. The diametric size of lid 1000 generally corresponds to the size of the basket 1010, and may vary based on application and suitability. In the exemplary embodiment shown in FIGS. 30 and 31, an outer diameter of the lid 1000 is substantially the same as an outer diameter of the basket 1010. In addition, the opening 1012 of the lid 1000 may be larger in diameter than the opening 1014 of the basket 1010. In one example, fastening tabs 1016 of the basket 1010 may be received through the opening 1012 of the lid 1000.

The lid 1000 includes alternating raised portions 1018 and lowered portions 1020 along a circumferential direction on a first surface 1022. The raised portions 1018 extend radially from the lid opening 1012 toward an outer periphery 1024 of the lid 1000. The lowered portions 1020 extend radially from the lid opening 1012 and terminate at a port housing 1026. Each port housing 1026 includes a first port 1028 which opens toward the lowered portion 1020. The port housings 1026 extend to a height above the raised portions 1022. The port housings 1026 further include a second port 1030, positioned on a second surface 1032 of the lid 1000.

The lid 1000 may be installed on basket 1010 storing an additive material 122. In this configuration, the additive material 122 is positioned proximate to the second surface 1032 of lid 1000. During manufacturing, the lid 1000 is configured to prevent or prevent leakage of the additive material 122 from the basket 1010. For example, where the additive material 122 has been liquefied, the material 122 would normally flow over the sides of the basket 1010 if the basket 1010 were tilted beyond a certain extent. With the lid 1000 in place, the additive material 122 may be at least partially retained in basket 1010 when the basket is tilted beyond the certain extent.

In the exemplary embodiment described above and shown in FIGS. 30-33, if the basket 1010 and lid 1000 are tilted in one direction, the additive material 122 may flow through the second port 1030 such that the port housing 1026 becomes filled with the additive material 122. If the basket is then be tilted in another, generally opposite, direction, beyond a certain extent, the additive material 122 may flow out of the first port 1028 and into a lowered portion 1020 toward a center of the lid 1000. Due to the multiple-turn process described above for the additive material 122 to escape through the first port 1028, the amount of additive material 122 escaping the basket 1010 may be limited.

Figure 32:
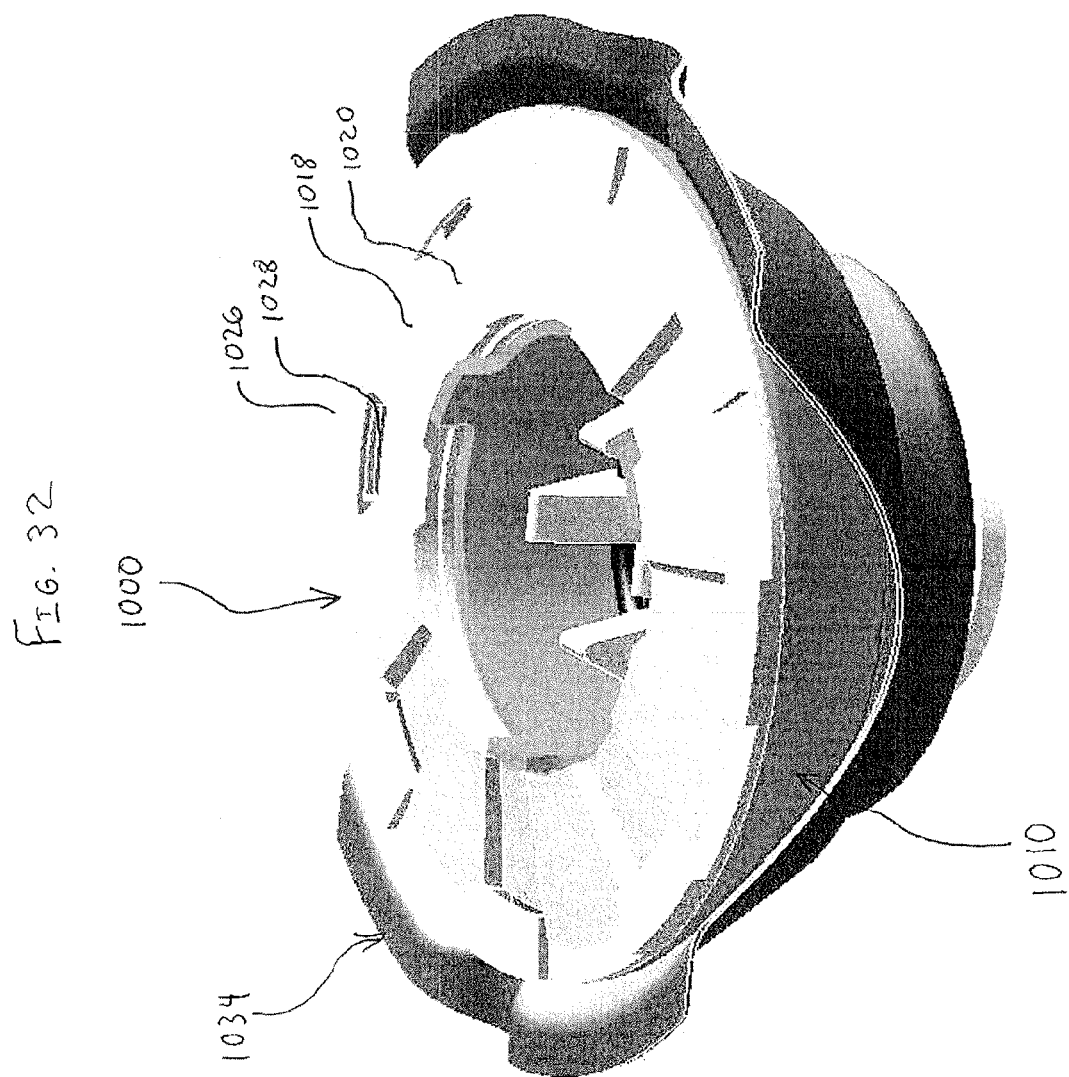
FIG. 32 is a perspective view of the lid of FIG. 30 together with a basket and a retainer.
Figure 33:
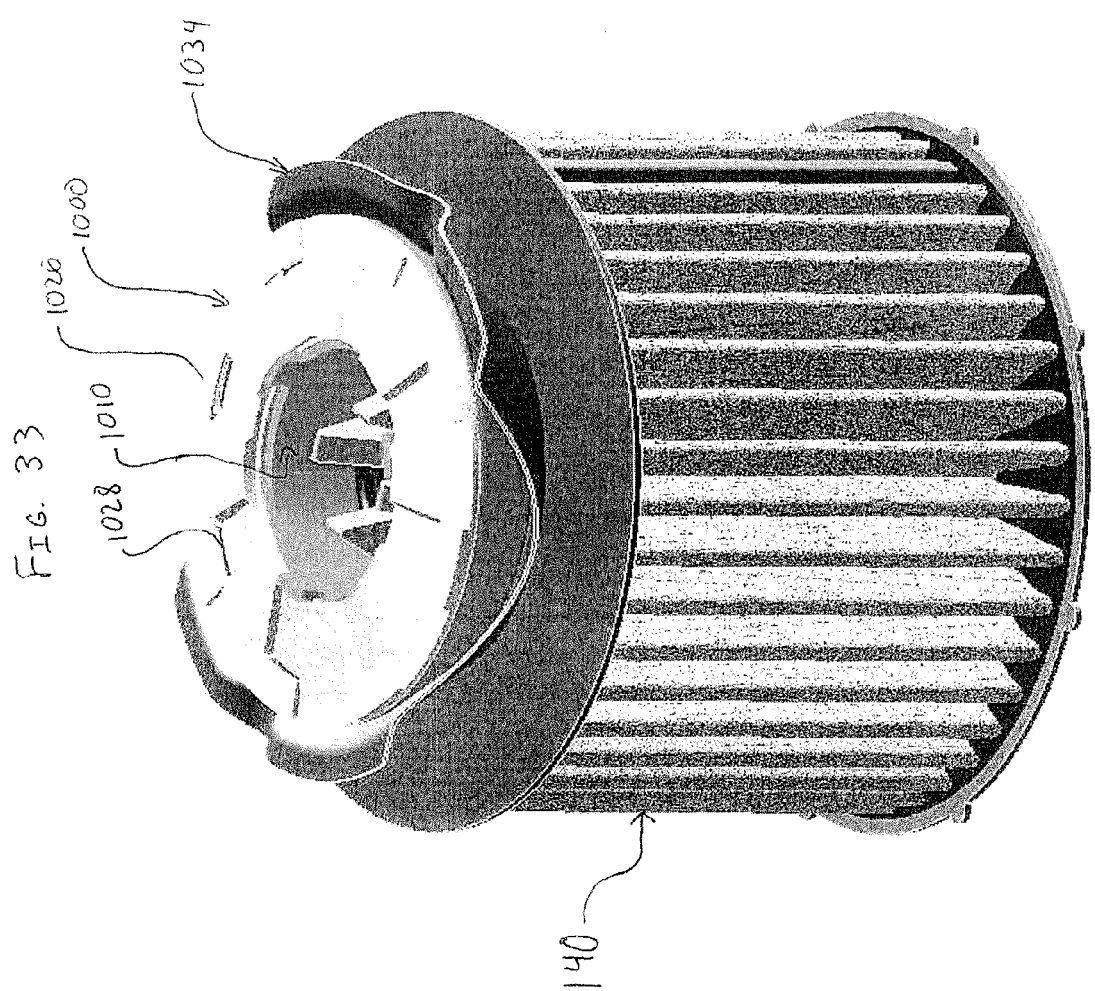
FIG. 33 is a perspective view of the lid of FIG. 30 together with a basket, a retainer, and a filter assembly.

FIGS. 32 and 33 illustrate the lid 1000 described above with reference to FIGS. 30 and 31 assembled together with a retainer 1034 and filter assembly 140 (FIG. 33). The basket 1010 and retainer 1034 may be in the form of any of the baskets and retainers described in the exemplary embodiments above. The basket 1010 and retainer 1034 may be assembled together with the filter assembly 140 described above as well. While the lid 1000 may limit or prevent escape of additive material 122 during manufacturing as described above, the lid 1000 still allows for the additive material 122 to be delivered to oil or other fluid to be filtered.

Figure 34:
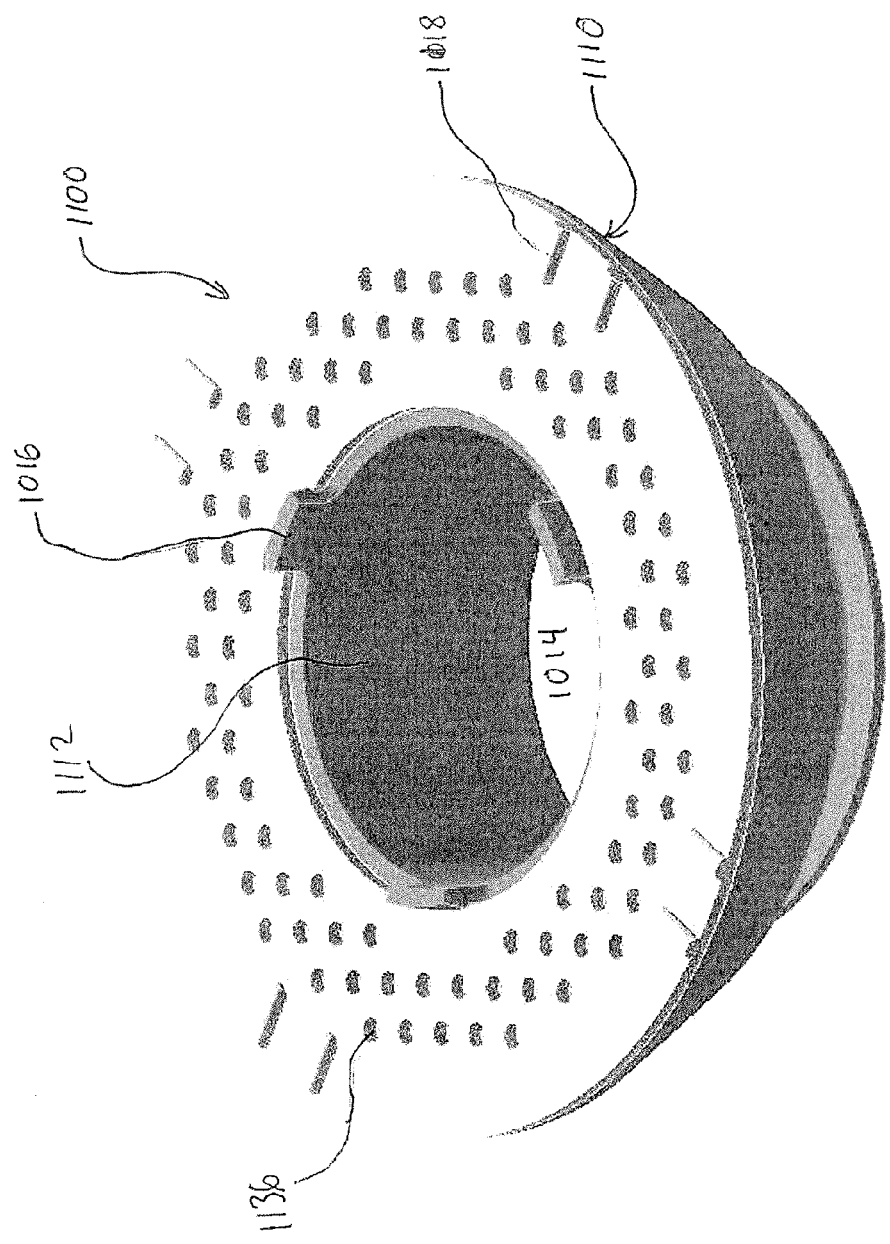
FIG. 34 is a perspective view a lid constructed in accordance with another exemplary embodiment of the present invention.
Figure 35:
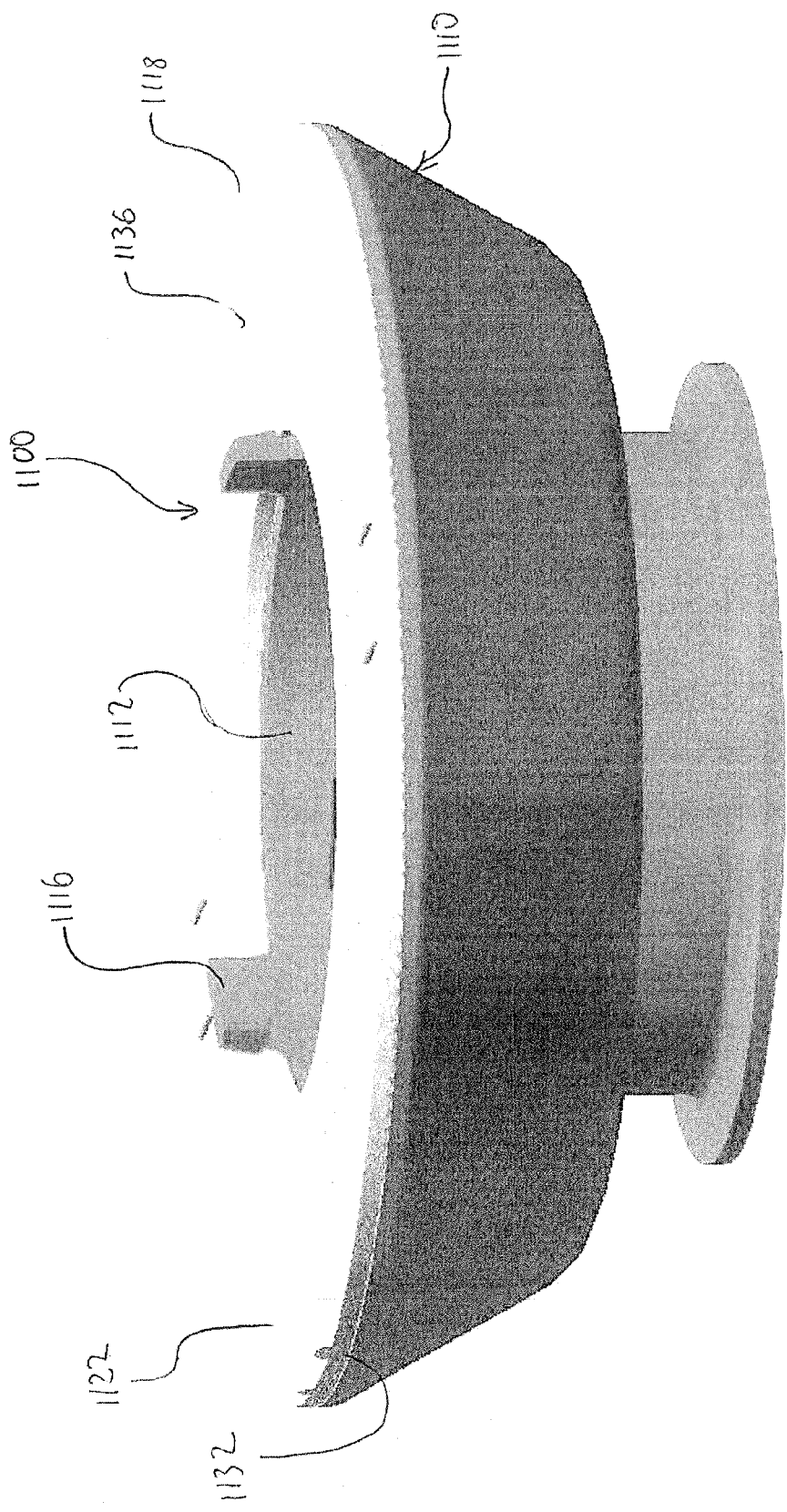
FIG. 35 is a perspective view of the lid of FIG. 34 together with a basket.

FIGS. 34-35 illustrate a lid 1100 assembled with a basket 1110 according to another exemplary embodiment of the present invention. The lid 1100 is annular shaped and includes a concentric opening 1112 extending therethrough. The lid 1100 may be installed on the basket 1110 such that the opening 1112 of the lid 1100 is concentric with an opening 1114 of the basket 1110. The diametric size of the lid 1100 generally corresponds to the size of the basket 1110, and may vary based on application and suitability. In the exemplary embodiment shown in FIGS. 34-35, an outer diameter of the lid 1100 is substantially the same as an outer diameter of the basket 1110. In addition, the opening 1112 of the lid 1100 may be larger in diameter than the opening 1114 of the basket 1110. In one example, fastening tabs 1116 of the basket 1110 may be received through the opening 1112 of the lid 1100.

In the exemplary embodiment shown in FIGS. 34 and 35, an outer diameter of the lid 1100 is substantially the same as an outer diameter of the basket 1110. In addition, the opening 1112 of the lid 1100 may be larger in diameter than the opening 1114 of the basket such that fastening tabs 1116 of the basket 1110 may be received through the opening 1112 of the lid 1100.

The lid 1100 is shaped substantially as an annular plate. The lid 1100 includes a first surface 1122 facing away from the basket 1112 and a second surface 1132 facing the basket 1110 and the additive material 122 stored in the basket 1110. The first surface 1122 includes at least one raised portion 1118 which me be used, for example, as a spacer. The lid 1100 includes a plurality of apertures 1136 disposed on the first surface 1122. The apertures 1136 allow for the stored additive material (not shown) to be delivered to the oil or other fluid to be filtered.

Similar to the exemplary embodiment described above in FIGS. 30-33, the lid 1100 of FIGS. 34-35 may limit the escape of additive material from the basket 1110 during a manufacturing process where the basket is tilted beyond a certain extent.

FIGS. 36 and 37 illustrate the lid 1100 described above with reference to FIGS. 34 and 35 assembled together with a retainer 1134 and filter assembly 140 (FIG. 37). The basket 1110 and retainer 1134 may be in the form of any of the baskets and retainers described in the exemplary embodiments above. The basket 1110 and retainer 1134 may be assembled together with the filter assembly 140 described above as well. While the lid 1100 may limit or prevent escape of additive material (not shown) during manufacturing as described above, the lid 1100 still allows for the additive material to be delivered to oil or other fluid to be filtered.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode for carrying out this invention, but that the invention will include all embodiments falling within the scope of the present application.

What is claimed is:

1. An additive carrier for a spin-on filter, the additive carrier comprising:
   a top wall including a retainer-receiving seat, an upper planar surface, and an outer perimeter, the retainer-receiving seat including:
      a bottom wall spaced apart from the upper surface and formed to include an opening extending through the bottom wall;
      a pair of opposing side walls extending downward from the upper surface to the bottom wall, the side walls spaced apart from and parallel to one another; and
      a pair of partial frustoconical sections positioned on opposing sides of the bottom wall, each partial frustoconical section extending between the pair of side walls and extending from the bottom wall to the upper surface; and
   a cylindrical retaining wall coupled to the top wall along the outer perimeter and extending downward from the upper surface, the retaining wall defining a plurality of downwardly extending projections and a plurality of gaps that are positioned between adjacent projections, the projections circumferentially spaced around the retaining wall,
   wherein the top wall and the retaining wall together define a circumferentially extending bottom recess configured to receive and store an additive material, and the plurality of gaps are in fluid communication with the bottom recess.

2. The additive carrier of claim 1, wherein a plurality of flanges extend radially within the bottom recess and along the top wall, and wherein the flanges are spaced apart in a circumferential direction of the bottom recess to form a plurality of sub-recesses.

3. The additive carrier of claim 2, wherein each gap is in fluid communication with at least one of the sub-recess.

4. The additive carrier of claim 3, wherein a majority of the flanges intersect with the projections of the retaining wall.

5. The additive carrier of claim 4, wherein the flanges extend along the top wall from the bottom wall to the retaining wall.

6. The additive carrier of claim 2, wherein the upper surface of the top wall and the bottom wall are spaced apart by a distance, wherein the projections of the retaining wall extend to the distance, and wherein the gaps are formed such that portions of the retaining wall adjacent to the projections extend to less than the distance.

7. The additive carrier of claim 6, wherein the flanges extend from the top wall to the distance.

8. The additive carrier of claim 2, wherein each sub-recess holds a different volume of additive than an adjacent sub-recess.

9. A spin-on filter comprising:
   a support structure including a first end plate at a first end of the structure, a second end plate at a second end of the structure, and a central opening formed in and extending though at least the first end plate, wherein the first end of the structure is an upstream end of the spin-on filter;
   a filter medium disposed between the first end plate and second end plate in a substantially cylindrical configuration;
   a relief valve including a plurality of legs, the relief valve at least partially seated in the central opening; and
   an additive carrier positioned at the first end of the support structure and aligned with the support structure along an axis, the additive carrier comprising:
      a top wall including a retainer-receiving seat, an upper planar surface, and an outer perimeter, the retainer-receiving seat including:
         a bottom wall spaced apart from the upper surface and formed to include a concentric opening extending through the bottom wall;
         a pair of opposing side walls extending downward from the upper surface to the bottom wall, the side walls spaced apart from and parallel to one another; and
         a pair of partial frustoconical sections positioned on opposing sides of the bottom wall, each partial frustoconical section extending between the pair of side walls and extending from the bottom wall to the upper surface; and
      a cylindrical retaining wall coupled to the top wall along the outer perimeter and extending downward from the upper surface, the retaining wall defining a plurality of downwardly extending projections and a plurality of gaps that are positioned between adjacent projections, the projections circumferentially spaced around the retaining wall, wherein the top wall and the retaining wall together define a circumferentially extending bottom recess configured to receive and store an additive material, and the plurality of gaps are in fluid communication with the bottom recess; and a retainer comprising:
a first end;
a second end spaced apart from the first end;
a bowl shaped section extending between the first end and the second end; and
an aperture formed in the bowl shaped section,
wherein the retainer is positioned within the retainer-receiving seat of the additive carrier such that the aperture is concentric with the opening, and the retainer is engaged with the relief valve to trap the additive carrier relative to the support structure.

10. The spin-on filter of claim 9, wherein the additive material is in a solid state.

11. The spin-on filter of claim 9, wherein a plurality of flanges extend radially within the bottom recess and along the top wall, and wherein the flanges are spaced apart in a circumferential direction of the bottom recess to form a plurality of sub-recesses.

12. The spin-on filter of claim 11, wherein each gap is in fluid communication with at least one of the sub-recess.

13. The spin-on filter of claim 12, wherein a majority of the flanges intersect with the projections of the retaining wall.

14. The spin-on filter of claim 12, wherein the projections are configured to engage with the first end plate of the support structure when the additive carrier is positioned at the first end of the support structure, and wherein the gaps define flow apertures permitting flow of fluid into the sub-recesses.

15. The spin-on filter of claim 11, wherein the flanges extend along the top wall from the bottom wall to the retaining wall.

16. The spin-on filter of claim 11, wherein the upper surface of the top wall and the bottom wall are spaced apart by a distance, wherein the projections of the retaining wall extend to the distance, and wherein the gaps are formed such that portions of the retaining wall adjacent to the projections extend to less than the distance.

17. The spin-on filter of claim 16, wherein the flanges extend from the top wall to the distance.

18. The spin-on filter of claim 11, wherein each sub-recess holds a different volume of additive than an adjacent sub-recess.

19. The spin-on filter of claim 9, wherein the first and second ends of the retainer are each formed to include a depression, and wherein the additive carrier further includes depressions formed into opposing ends of the retainer-receiving seat to receive the depressions of the first and second ends of the retainer.

* * * * *